US006731791B2

(12) United States Patent
Mitsuhashi et al.

(10) Patent No.: US 6,731,791 B2
(45) Date of Patent: May 4, 2004

(54) RECORDING APPARATUS

(75) Inventors: Shunya Mitsuhashi, Tokyo (JP); Shuichi Kumada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/268,944

(22) Filed: Oct. 11, 2002

(65) Prior Publication Data

US 2003/0081829 A1 May 1, 2003

Related U.S. Application Data

(62) Division of application No. 09/659,623, filed on Sep. 11, 2000, now Pat. No. 6,535,631, which is a division of application No. 08/757,291, filed on Nov. 27, 1996, now Pat. No. 6,198,840, which is a division of application No. 08/409,951, filed on Mar. 23, 1995, now Pat. No. 5,647,020, which is a continuation of application No. 08/101,591, filed on Dec. 23, 1992, now abandoned, which is a continuation of application No. 07/602,697, filed on Oct. 24, 1990, now abandoned.

(30) Foreign Application Priority Data

| | | |
|---|---|---|
| Oct. 24, 1989 | (JP) | 01-274831 |
| Mar. 5, 1990 | (JP) | 02-51650 |
| Apr. 12, 1990 | (JP) | 02-98347 |

(51) Int. Cl.$^{7}$ .................................................. G06K 9/00

(52) U.S. Cl. ....................................... 382/162; 358/518

(58) Field of Search ................................ 382/162, 167, 382/229; 358/501, 518, 519, 523

(56) References Cited

U.S. PATENT DOCUMENTS

| | | | | |
|---|---|---|---|---|
| 4,328,515 A | | 5/1982 | Wellendorf | 358/80 |
| 4,414,636 A | * | 11/1983 | Ueda et al. | 358/518 |
| 4,515,487 A | | 5/1985 | Minami | 400/121 |
| 4,622,594 A | | 11/1986 | Honjo et al. | 358/293 |
| 4,687,334 A | | 8/1987 | Miyakawa | 356/404 |
| 4,723,129 A | | 2/1988 | Endo et al. | 346/1.1 |
| 4,740,793 A | | 4/1988 | Wolfson et al. | 343/700 |
| 4,740,796 A | | 4/1988 | Endo et al. | 346/1.1 |
| 4,740,833 A | | 4/1988 | Shiota et al. | 358/80 |
| 4,754,326 A | | 6/1988 | Kram et al. | 364/900 |
| 4,799,053 A | | 1/1989 | Van Aken et al. | 340/703 |
| 4,802,107 A | | 1/1989 | Yamamoto et al. | 382/167 |
| 4,805,013 A | | 2/1989 | Dei et al. | 358/80 |
| 4,818,979 A | | 4/1989 | Manson | 340/723 |
| 4,928,167 A | | 5/1990 | Tatsumi et al. | 358/80 |
| 4,942,461 A | | 7/1990 | Abe et al. | 358/75 |
| 5,027,420 A | | 6/1991 | Takebayashi et al. | 382/167 |
| 5,038,300 A | | 8/1991 | Seiler et al. | 364/521 |
| 5,042,078 A | | 8/1991 | Oshikoshi et al. | 382/54 |
| 5,045,967 A | | 9/1991 | Igarashi | 364/518 |
| 5,057,913 A | | 10/1991 | Nagata et al. | 358/302 |

(List continued on next page.)

FOREIGN PATENT DOCUMENTS

| | | |
|---|---|---|
| EP | 0 092 747 | 11/1983 |
| EP | 0321983 | 6/1989 |
| GB | 2215554 | 9/1989 |
| JP | 56-119815 | 9/1981 |
| JP | 60-240292 | 11/1985 |
| JP | 61-23470 | 1/1986 |
| JP | 61-175818 | 8/1986 |
| JP | 62-268648 | 11/1987 |
| JP | 63-254469 | 10/1988 |
| JP | 64-27952 | 1/1989 |
| JP | 1-184140 | 7/1989 |
| JP | 1-259951 | 10/1989 |

*Primary Examiner*—Yon J. Couso
(74) *Attorney, Agent, or Firm*—Fitzpatrick, Cella, Harper & Scinto

(57) ABSTRACT

A recording apparatus includes a color table for storing color information corresponding 1:1 to color information codes. The apparatus executes color recording by providing color information corresponding to the color information code to the given character data or image data. The apparatus features a function of expanding the color information, and a function of confirming the color information.

17 Claims, 25 Drawing Sheets

U.S. PATENT DOCUMENTS

| | | | | |
|---|---|---|---|---|
| 5,073,818 | A | 12/1991 | Iida | 358/80 |
| 5,162,899 | A | 11/1992 | Naka et al. | 382/167 |
| 5,168,352 | A | 12/1992 | Naka et al. | 358/81 |
| 5,602,655 | A | 2/1997 | Arakawa et al. | 358/501 |
| 5,621,873 | A | 4/1997 | Tanaka et al. | 395/779 |
| 5,631,983 | A | 5/1997 | Ohnishi et al. | 382/284 |
| 5,703,696 | A | 12/1997 | Sakai et al. | 358/404 |
| 5,784,180 | A | 7/1998 | Sakai et al. | 358/501 |

* cited by examiner

Flag : WRITING INHIBITION/ALLOWANCE FLAG
Rn : VALUE OF RED COMPONENT OF COLOR
Gn : VALUE OF GREEN COMPONENT OF COLOR
Bn : VALUE OF BLUE COMPONENT OF COLOR

| TABLE NO. | R COMPONENT VALUE | G COMPONENT VALUE | B COMPONENT VALUE | NAME | POINTER AREA | SECONDARY NAME |
|---|---|---|---|---|---|---|
| 1 | | | | RED | | |
| 2 | | | | GREEN | | |
| 3 | | | | BLUE | | |
| --------- | | | | ------- | | |

| COMMAND NO. | PRINT POSITION | CHARACTER DATA |
|---|---|---|

| COMMAND NO. | INDEX NO. |
|---|---|

POINTER → | COLOR REGISTRATION DATA OF INDEX NO. 0 |
| COLOR REGISTRATION DATA OF INDEX NO. 1 |
| |
| COLOR REGISTRATION DATA OF INDEX NO. n |

FIG. 16

R, G, B TYPE COLOR REGISTRATION DATA

| COLOR REGISTRATION COMMAND NO. | INDEX NO. | CLASSIFI-CATION | R VALUE | G VALUE | B VALUE |
|---|---|---|---|---|---|

C, M, Y, K TYPE COLOR REGISTRATION DATA

| COLOR REGISTRATION COMMAND NO. | INDEX NO. | CLASSIFI-CATION | C VALUE | M VALUE | Y VALUE | K VALUE |
|---|---|---|---|---|---|---|

C, M, Y TYPE COLOR REGISTRATION DATA

| COLOR REGISTRATION COMMAND NO. | INDEX NO. | CLASSIFI-CATION | C VALUE | M VALUE | Y VALUE |
|---|---|---|---|---|---|

H, S, L TYPE COLOR REGISTRATION DATA

| COLOR REGISTRATION COMMAND NO. | INDEX NO. | CLASSIFI-CATION | H VALUE | S VALUE | L VALUE |
|---|---|---|---|---|---|

FIG. 17A

POINTER →

| | |
|---|---|
| CLASSIFICATION FLAG OF INDEX NO. 0 | COLOR REGISTRATION DATA OF INDEX NO. 0 |
| CLASSIFICATION FLAG OF INDEX NO. 1 | COLOR REGISTRATION DATA OF INDEX NO. 1 |
| ~ | ~ |
| CLASSIFICATION FLAG OF INDEX NO. n | COLOR REGISTRATION DATA OF INDEX NO. n |

FIG. 17B

POINTER →

| | | | |
|---|---|---|---|
| $C_0$ | $M_0$ | $Y_0$ | $K_0$ |
| $C_1$ | $M_1$ | $Y_1$ | $K_1$ |
| ~ | ~ | ~ | ~ |
| $C_n$ | $M_n$ | $Y_n$ | $K_n$ |

FIG. 23

| INDEX NO. | REGISTRATION COLOR | REGISTRATION COLOR DATA |
|---|---|---|
| 1 | PRINTED IN RED | R=255, G=0, B=0 |
| 2 | PRINTED IN CYAN | C=255, M=0, Y=0, K=0 |
| 3 | PRINTED IN MAGENTA | C=0, M=255, Y=0 |
| ⋮ | ⋮ | ⋮ |
| 255 | | R=200, G=100, B=50 |

FIG. 24

| INDEX NO. | REGISTRATION COLOR | REGISTRATION COLOR DATA |
|---|---|---|
| 10 | PRINTED IN CYAN | C=255, M=0, Y=0, K=0 |
| 11 | PRINTED IN YELLOW | C=0, M=0, Y=255, K=0 |
| ⋮ | ⋮ | ⋮ |
| 20 | | C=300, M=200, Y=100, K=50 |

RECORDING APPARATUS

This application is a division of application Ser. No. 09/659,623, filed Sep. 11, 2000, now U.S. Pat. No. 6,535,631 which is a divisional of application Ser. No. 08/757,291, filed Nov. 27, 1996, now U.S. Pat No. 6,198,840 which is a divisional of application Ser. No. 08/409,951, filed Mar. 23, 1995, now U.S. Pat No. 5,647,020 which is a continuation of application Ser. No. 08/101,591, filed Dec. 23, 1992, now abandoned which is a continuation of application Ser. No. 07/602,697, filed Oct. 24, 1990 now abandoned.

BACKGROUND OF THE INVENTION

1. Field of the Invention

The present invention relates to a recording apparatus for receiving and recording information to be recorded.

2. Description of the Related Art

In the field of color recording apparatuses, such as color printing apparatuses, there are already proposed, in the U.S. patent application Ser. Nos. 521,676; 521,675 and 521,674 of the assignee of the present application, those apparatuses having memory means known as a color table or color palette. Also U.S. Pat. No. 5,621,873 (based on Japanese Patent Application Nos. 1-225351 and 1-299057) discloses a color monitor utilizing such color table as mentioned above.

However such memory means storing information on color, called color table or color palette, is fixed and lacks expansivity, so that, in case of storing information on a larger number of colors, it is necessary to move the currently stored information to another area and to newly register the information on new colors.

Also in the conventional color recording of information such as characters or graphics by a color recording apparatus, the information to be recorded and the color to be recorded are received in the form of codes from an information source such as a host computer.

Such color recording apparatus reproduces the characters or graphics of designated color on a recording sheet, by converting said codes into corresponding patterns, also separates the designated color into primary color components (R, G, B or Y, M, C, K) and recording said patterns of different color components in superposed manner.

For separating the designated color into primary color components, such color recording apparatus utilizes a memory of table form storing output densities of different color components at each address corresponding to a color (or identification) code.

The values of such color components are transmitted in advance from the host computer, and are stored, by the central processing unit of the color recording apparatus, into said memory.

As the quantity of information that can be stored in said memory is variable, it is necessary to provide said memory with a directory table indicating the color codes stored in said memory and the storage addresses thereof.

However, in order to designate the color to be recorded in the image recording, the operator has at first to refer to a code conversion table indicating the relationship between color names and color codes, and then to enter the color code and the values of color components of the desired color into the host computer. Also in case of confirming the registered color code and the color components thereof on the display of the host computer, it has been difficult for the operator to imagine the tone of the color from the color code.

Also the conventional recording apparatus for color recording of characters or graphics based on the color information from a host apparatus does not have the function of memorizing the color information from the host apparatus and releasing a list of thus memorized color information.

For this reason, the matching between the color shown on the display of the host computer and the color reproduced by the recording apparatus cannot be easily confirmed, and this fact results in the following drawbacks.

In order to confirm whether desired colors are actually obtained, the color output data of the characters or graphics have to be reproduced on the recording apparatus. Such operation results in the waste of recording materials such as toner or ink in case of complicated color output data, and gives rise to a significant waiting time for color reproduction.

SUMMARY OF THE INVENTION

An object of the present invention is to eliminate the drawbacks in the prior technology.

Another object of the present invention is to provide a recording apparatus capable of renewing or expanding the information relating to color, possessed by the color recording apparatus itself.

The foregoing objects can be attained, according to an embodiment thereof, by a recording apparatus comprising internal memory means storing color information; input means for entering color information stored in external memory means, and control means for expanding or renewing color information stored in said internal memory means based on the color information entered by said input means and controlling recording means based on thus expanded or renewed color information.

Thus, according to the present invention, the color information stored in the external memory means is entered by the input means, then the color information stored in the internal memory means is expanded or renewed by the color information thus entered by the input means, and the recording means is controlled by the control means, based on thus expanded or renewed color information.

Still another object of the present invention is to provide a recording apparatus capable of easy registration and confirmation of the information related to recording, such as color components.

The above-mentioned object can be attained, according to an embodiment of the present invention, by a recording apparatus comprising memory means storing in advance plural record-related information and character information representing the names of said record-related information; and search means capable of receiving the name of said record-related information to be used in the recording by character information and extracting the corresponding record-related information from said memory means by keyword search based on thus received character information.

The present invention is further characterized by a fact that said record-related information is primary color components used in the color synthesis, and said name is the name the color obtained by said color synthesis.

Furthermore the present invention is characterized by a fact that said record-related information is character or graphic pattern, and said name is the name representing the form of said character or graphic pattern.

Still another object of the present invention is to provide a recording apparatus capable of easily reproducing desired color.

The above-mentioned object can be attained, according to another embodiment of the present invention, by a recording apparatus comprising input means for entering pattern information and color information encoded into predetermined codes; and image forming means for forming an image on a recording medium based on the pattern information and the color information entered by said input means, wherein said image forming means is capable of forming the image of a sample of said encoded color information.

Furthermore, the recording apparatus of the present invention is characterized by a fact that means for developing the encoded color information into an image for the purpose of sample display is also used commonly as means for developing the encoded pattern information as an image.

Still another object of the present invention is to provide a recording apparatus excellent in operability.

Still another object of the present invention is to provide a recording apparatus of a simple structure.

Still other objects of the present invention will become fully apparent from the following description of embodiments and the appended claims.

BRIEF DESCRIPTION OF THE DRAWINGS

FIG. 7 is a view showing the content of the color table in an embodiment of the present invention;

FIG. 16 is a view showing examples of color registration command of different data formats;

FIGS. 17A and 17B are views showing the structure of the color registration table;

FIGS. 23 and 24 are views of examples of list of contents of the color registration table;

DETAILED DESCRIPTION OF THE PREFERRED EMBODIMENTS

Now the present invention will be clarified in detail by embodiments thereof shown in the attached drawings.

Embodiment 1

Figure 1:
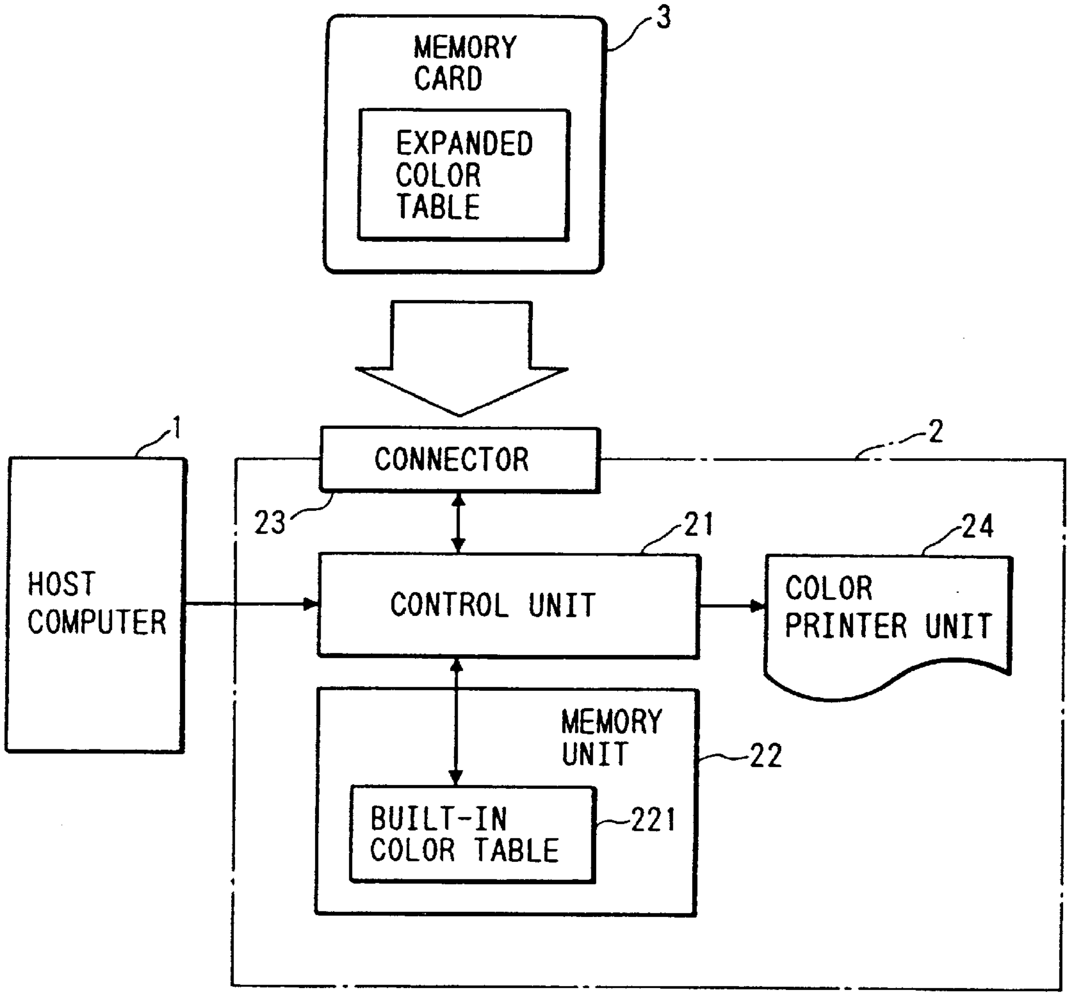
FIG. 1 is a block diagram of a first embodiment of the present invention.

FIG. 1 shows an embodiment of the present invention, wherein a host computer 1 provides a printing apparatus 2 with print information consisting of print data, such as character codes, color information codes and image data, and control codes.

The printing apparatus 2 can be connected to a memory card 3 constituting external memory means, through a connector 23.

The printing apparatus is composed of a control unit 21, a memory unit 22, a connector 23 and a color printer unit 24. The control unit 21, serving as expansion/renewal (expansion/update) means and control means, is adapted to read necessary information from the attached memory card 3 and to effect a process for expansion or renewal (update) of built-in color table 221. The memory unit 22, serving as internal memory means, is provided with a built-in color table 221 composed of a ROM or a RAM. The color printer unit 24 is composed of a color laser beam printer, having a printing mechanism for forming a permanent visible image on a recording sheet, according to print information etc. received from the host computer 1.

The character codes are developed by the control unit 21 on an internal memory thereof. The developed image data or entered image data are colored by the color table (color palette) 221, according to color information codes.

Figure 2:
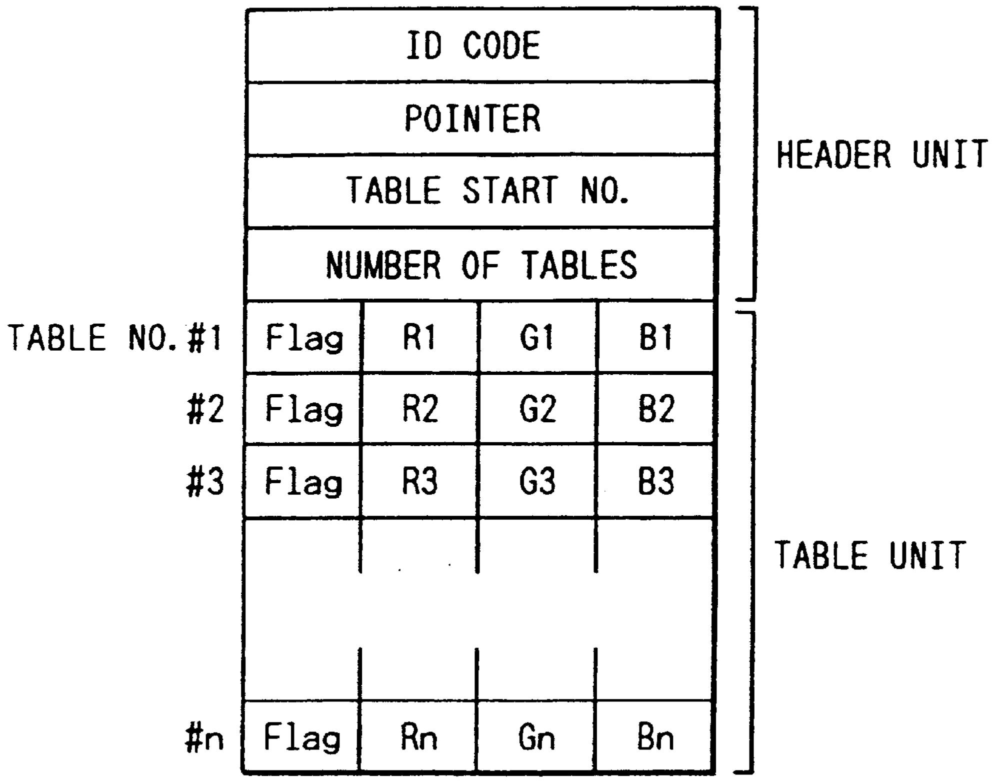
FIG. 2 is a view of an example of the structure of a built-in color table 221 shown in FIG. 1.

FIG. 2 shows the structure of the built-in color table 221 shown in FIG. 1.

The color table is composed of a header unit and a table unit, and the structure is same also in an expansion color table 31.

The header unit has an ID code area indicating that the data thereof constitute a color table, a pointer area indicating the top address of a table to be linked, a table start number area indicating the logic start number of the table, and a table number area indicating the number of consecutive tables starting from said start number.

The data unit has an area for the values of R, G, B components of color information, and a flag area indicating whether the data writing into said table is inhibited or not.

Said flag allows to identify whether the memory card constituting the external memory means is composed of a ROM or a RAM. The control unit 21 determines the values of color components to be printed by the color printer unit 24, based on the above-mentioned values of R, G, B components and the color table showing the correspondence of table numbers.

Figure 3:
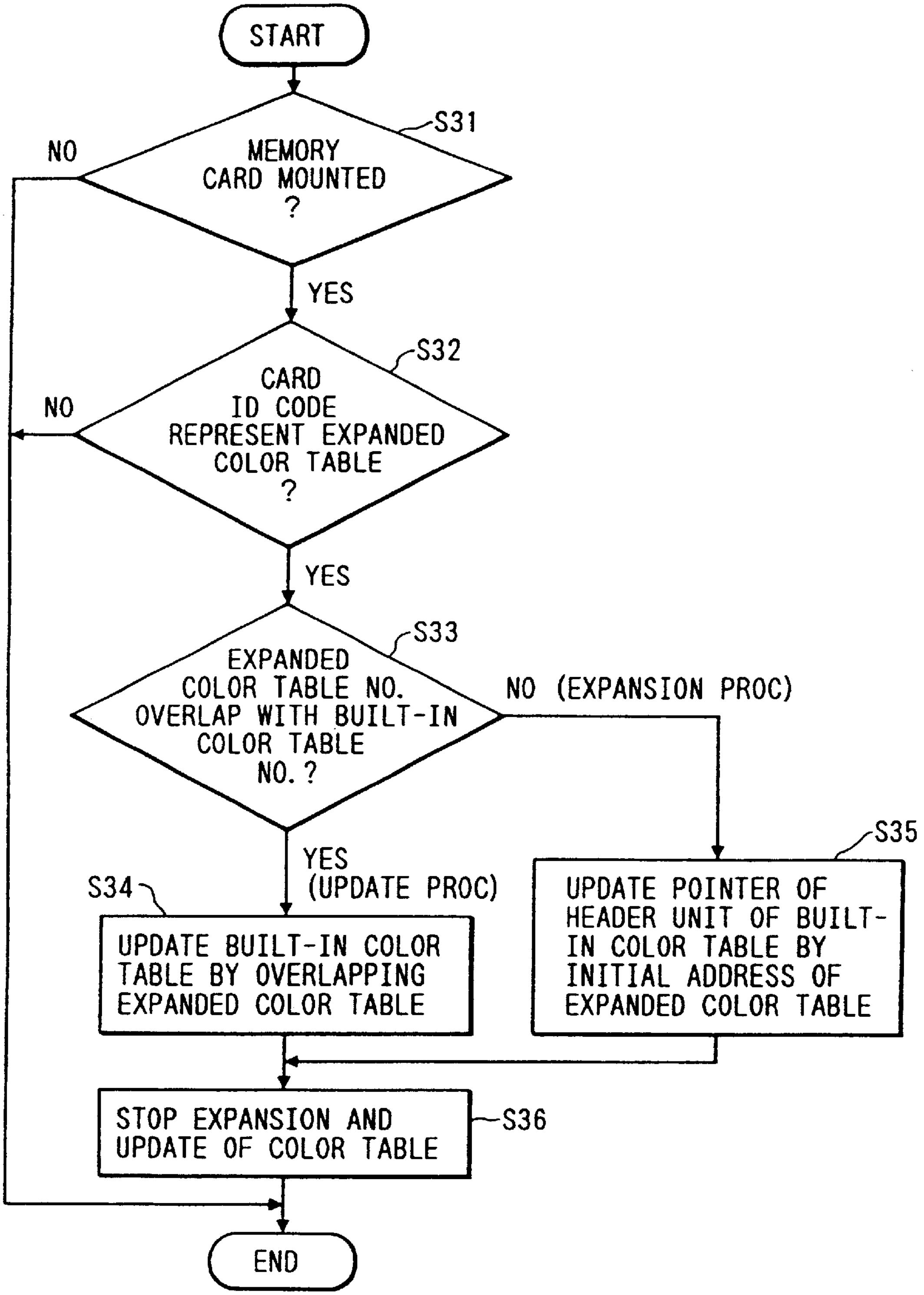
FIG. 3 is a flow chart showing an example of procedure for expansion or renewal of a color table by a control unit 21 shown in FIG. 1.

FIG. 3 is a flow chart showing an example of sequence of expansion/renewal of the color table by the control unit 21 shown in FIG. 1.

A step S31 discriminates whether the memory card 3 is mounted, and, if mounted, a step S32 discriminates whether said memory card 3 is a card of expansion color table, by reading an ID code in the top address of said memory card 3. If affirmative, a step S33 discriminates, from the table start number and the number of tables recorded in the header unit of said card, whether the table numbers of said card at least partly overlap with those of the built-in color table. If overlapping, a step S34 renews or updates the values of the built-in color table with those of the expanded color table, and a step S36 terminates the sequence.

On the other hand, if the step S33 identifies the absence of overlapping of table numbers, a step S35 renews the pointer of the header unit of the built-in color table to the top address of the expansion color table. Consequently the expansion color table is linked to the built-in color table, so that the color table is expanded.

If the step S31 identifies that the memory card is not mounted, the process for expansion or renewal of color table is not conducted.

Also said process is not executed if the step S32 identifies that the mounted card is not of the expansion color table.

Figure 4:
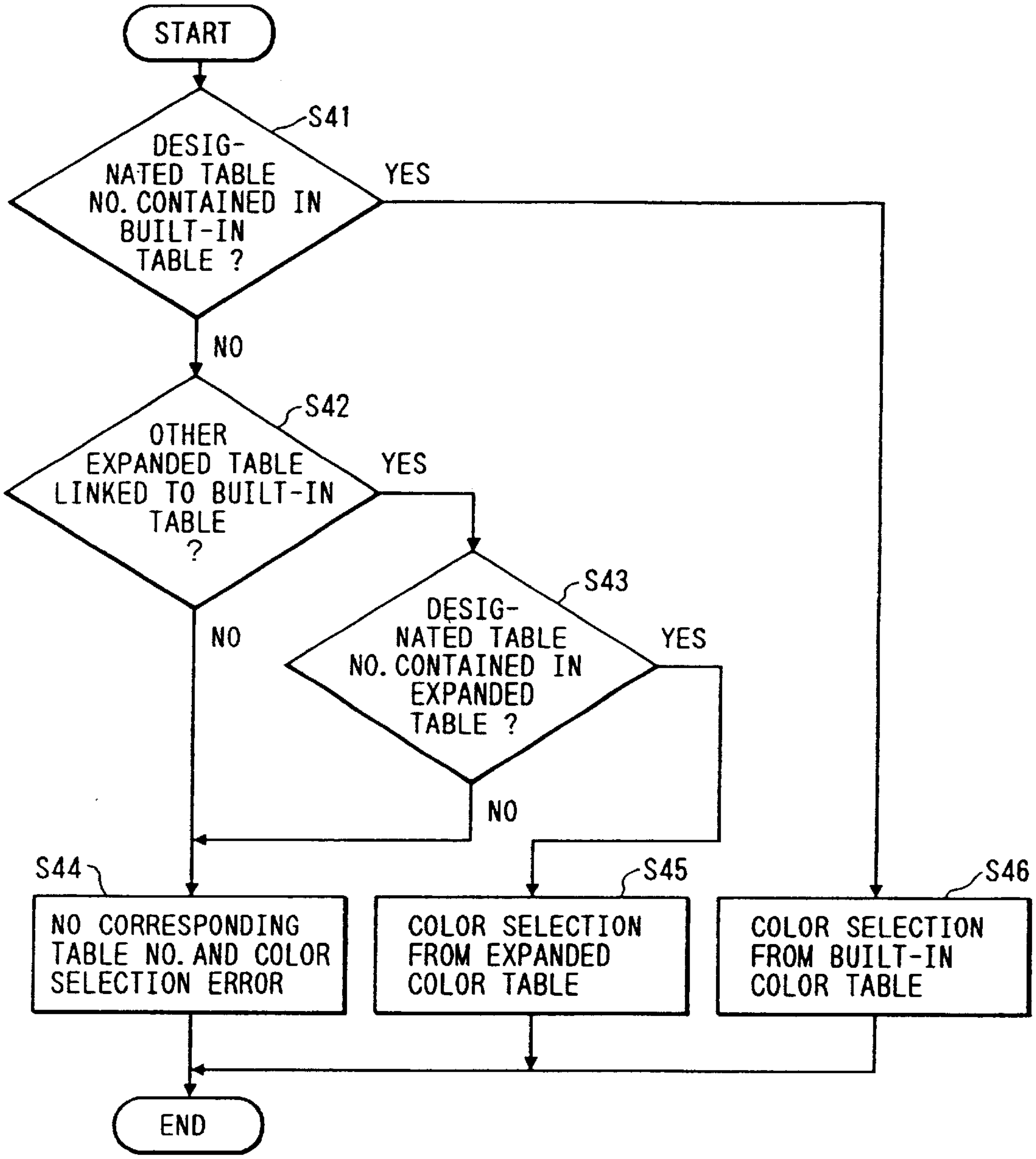
FIG. 4 is a flow chart showing an example of sequence for selecting the color table by the control unit 21 shown in FIG. 1.

FIG. 4 is a flow chart showing sequence for selecting the color table by the control unit 21 shown in FIG. 1.

When a table number of the color table is designated by the host computer, a step S41 discriminates whether said number is included in the built-in color table, and, if not, a step S42 discriminates whether other color table are linked to the built-in color table.

If not, a step S44 terminates the color table selecting sequence, disregarding the instruction from the host computer. This is a case of color selection error, due to the absence of corresponding table.

On the other hand, if the step S42 identifies that another color table is linked to the built-in color table, a step S43 discriminates whether the designated table number belongs to the expansion color table, and, if not, the sequence proceeds to a step S44. On the other hand, if said designated table number belongs to the expansion color table, the sequence proceeds to a step S45 for obtaining necessary color information from the expansion color table.

If the step S41 identifies that the designated table number is included in the built-in color table, a step S46 obtains necessary color information from said built-in color table.

When necessary color information is obtained, the data developed from the character codes or the image data without color information (for example bit map data) are given colors corresponding to said color information, and said data are developed in multi-level memories of R, G and B provided in the control unit 21.

As explained in the foregoing, the information on color of the built-in color table of the color printing apparatus can be instantly expanded or renewed by the mounting of a memory card storing an expansion color table which contains information on color. Consequently there is obtained an excellent advantage of dispensing with the conventional cumbersome operations of registration or renewal of the color table involving the host computer, even when a large amount of information on new colors is needed.

Variation of 1st Embodiment

In the foregoing embodiment, the color information is represented by red (R), green (G) and blue (B) components of each color. However, if the color is represented by yellow (Y), magenta (M), cyan (C) and black (K) which are dependent on the color recording apparatus itself or the spectral density of the ink used therein, there may be employed a card having Y, M, C, K components corrected for each apparatus or each ink, whereby constant color reproduction can be obtained from different recording apparatuses or from different inks, utilizing the same control means.

Also said color information may include parameters of a color reproducing process or even the algorithm itself of said process. Furthermore, in a color recording apparatus equipped with an external memory such as a floppy disk drive, such color information may be provided from said floppy disk.

Also in the foregoing embodiment, the color printer unit 24 is controlled by the color information expanded by linking the color information stored in a memory card constituting external memory means to that of the built-in color table 221 of the memory unit 22 constituting internal memory means, but it is also possible to rewrite the content of the built-in color table thereby renewing said table.

Said memory card can be of any medium that can store the color information, such as an IC card, an optical card, a magnetic card or the like.

Also the printer unit 24 is not limited to a color laser beam printer but can be a color ink jet printer, a color thermal transfer printer or a color dot printer.

As explained in the foregoing, the present embodiment can expand or renew the information on color, thereby reproducing a wide range of colors with a simple structure.

It is also possible to prepare plural cards respectively storing, for example, reddish (warm) colors, bluish (cold) colors, human skin colors etc. and to select a most appropriate memory card according to the image to be reproduced, such as a scenery or a human image.

Such structure provides a recording apparatus with sufficient expansivity, without enlarging the basic structure, particularly the color information memory thereof, of the recording apparatus.

Embodiment 2

In the present embodiment, the record-related information such as the colors to be synthesized or the particular character or graphic patterns are represented by trains of characters, and, at the image recording, the record-related information, such as color components, stored corresponding to a train of characters, is extracted from the memory means by keyword search. Therefore, in comparison with the conventional structure in which the color to be synthesized is represented by an identification number (color code or table code), a directory table indicating the correspondence between the color to be synthesized and the identification number is no longer necessary. It is rendered easier to register the color components in the memory means and to know the synthesized color, determined by the combination of color components, by displaying the character code and color components read from the memory means.

Figure 5:
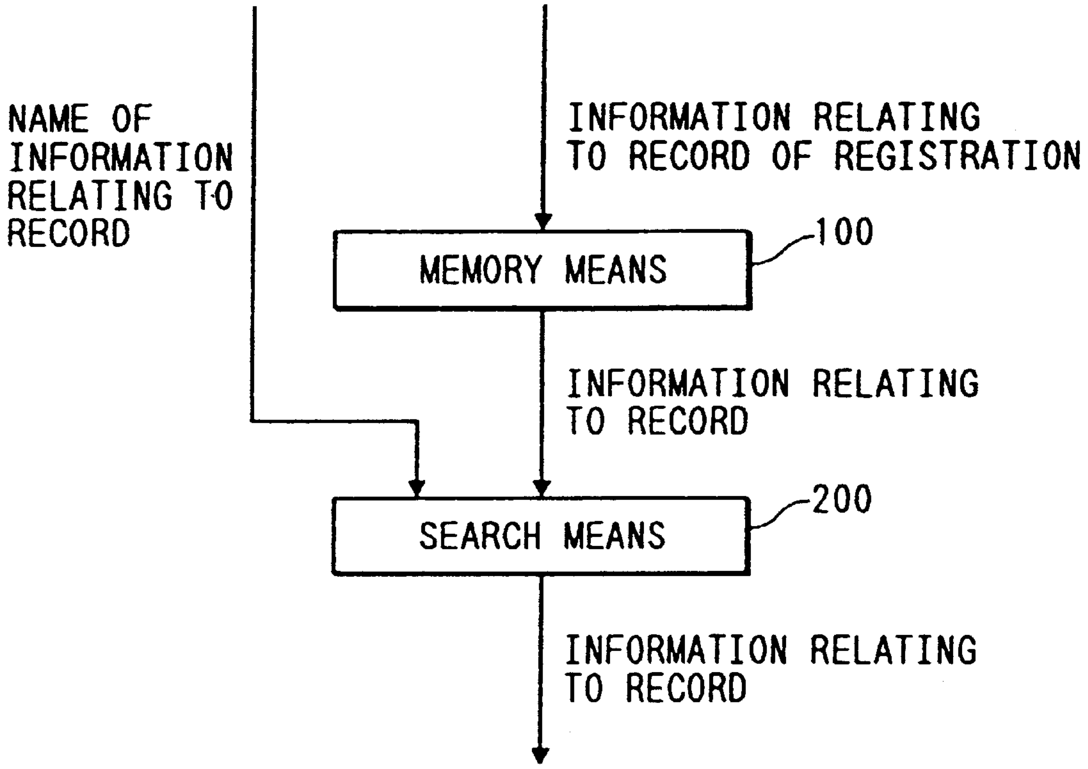
FIG. 5 is a block diagram of basic structure of an embodiment of the present invention.

FIG. 5 shows the basic structure of the second embodiment of the present invention.

The color recording apparatus of the present embodiment effects color recording through syntheses of plural basic colors.

Referring to FIG. 5, memory means 100 in advance stores plural record-related information and character information indicating the names of said record-related information. Search means 200 receives the name of said record-related information to be used in the recording, in the form of character train information, and extracts the corresponding record-related information from said memory means by means of keyword search based on thus received character information.

Figure 6:
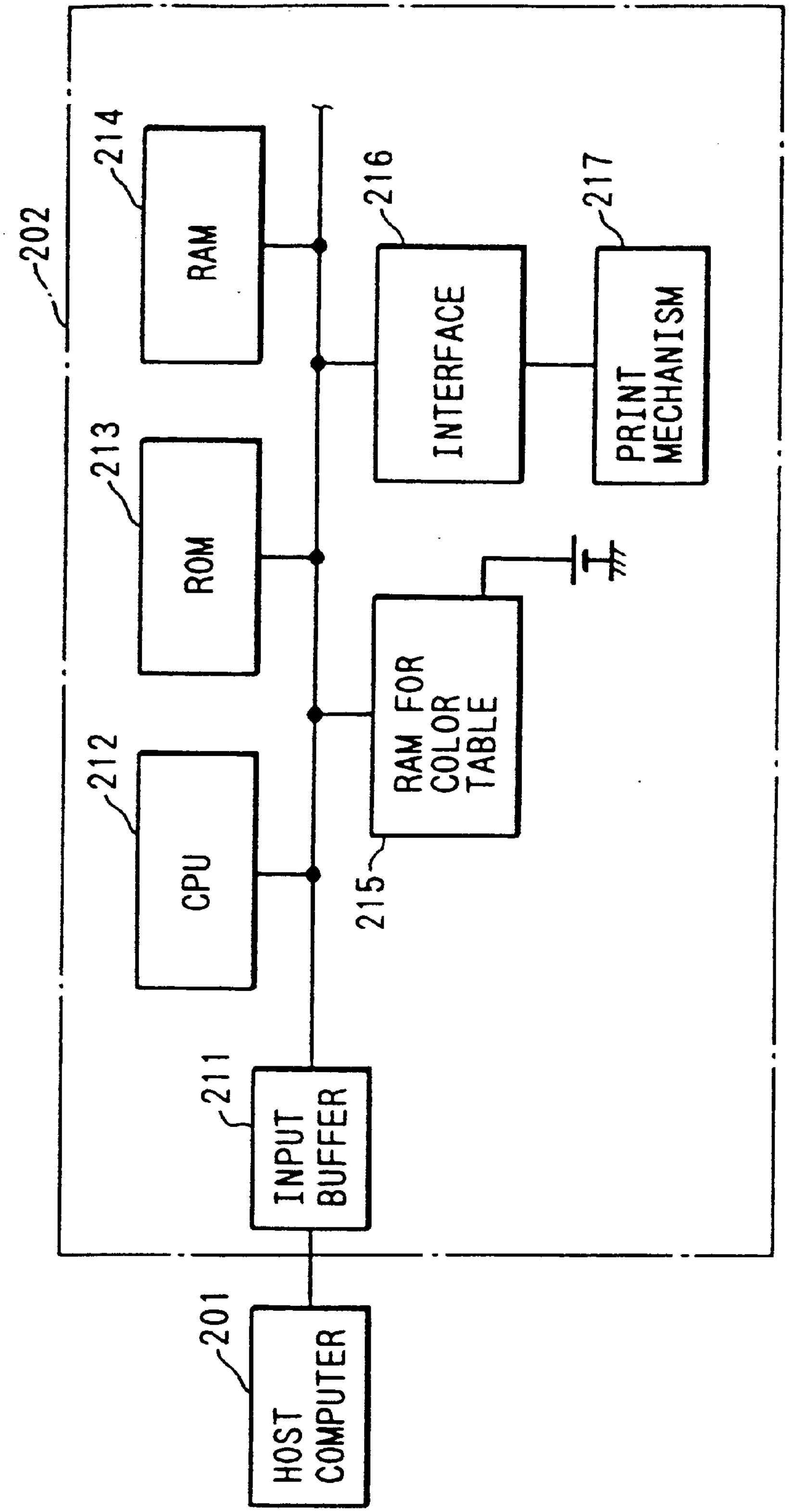
FIG. 6 is a block diagram of circuit structure of an embodiment of the present invention.

FIG. 6 shows the circuit structure of the present embodiment.

Referring to FIG. 6, an input buffer 211, a central processing unit (CPU) 212, a read-only memory (ROM) 213, a random access memory (RAM) 214, a color table RAM 215 and an interface 216 are mutually connected by a bus.

The input buffer 211 receives character or graphic information to be recorded, image information, color information to be recorded and record-related commands from a host computer and temporarily stores these data.

The CPU 212 controls the entire apparatus and sets the color components of coloring materials of basic colors to be used in the recording, based on the received color information. It also functions as search means.

Figure 8:
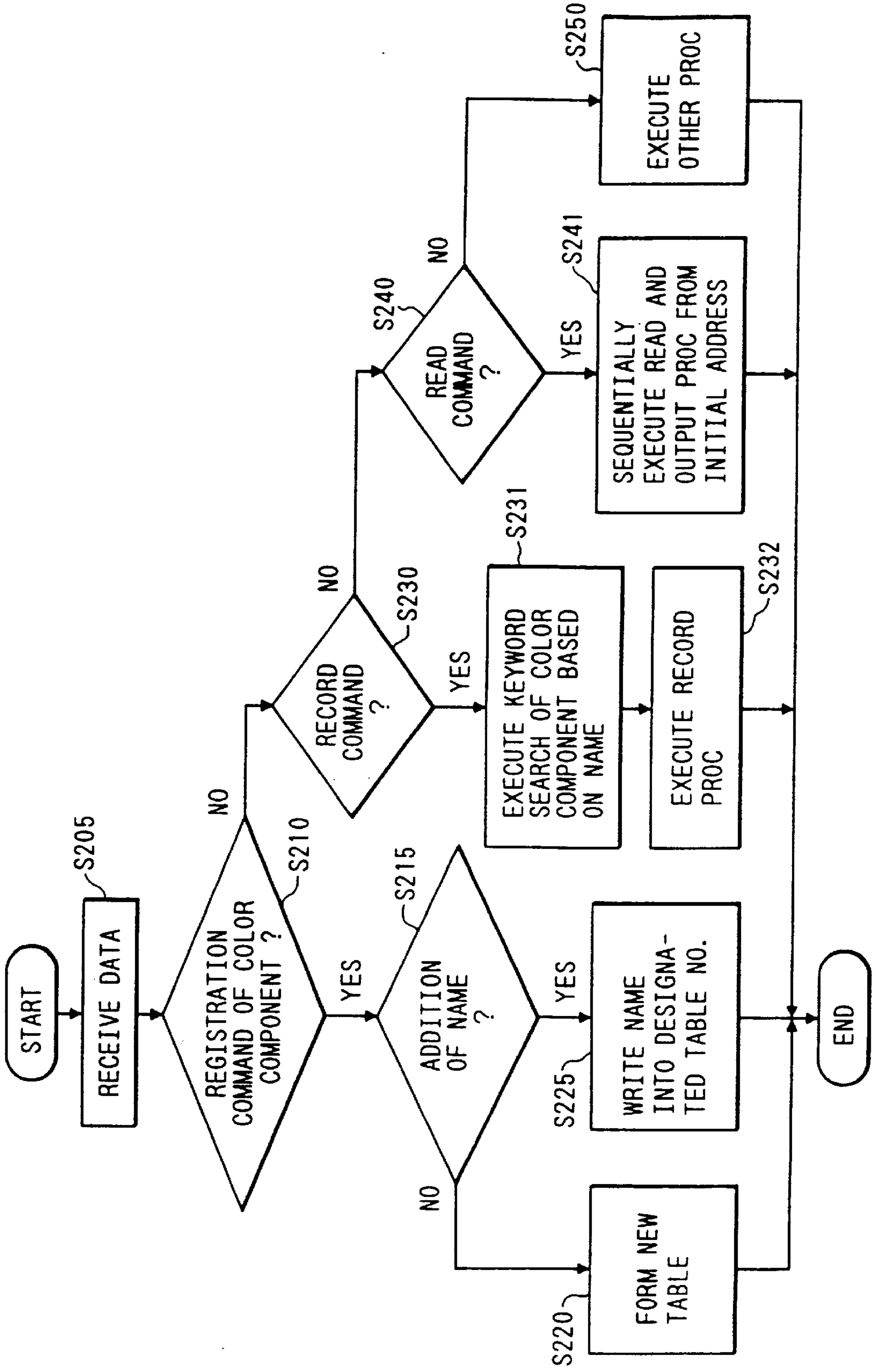
FIGS. 8 and 9 are flow charts showing control sequence executed by a CPU 12 in an embodiment of the present invention.
Figure 9:
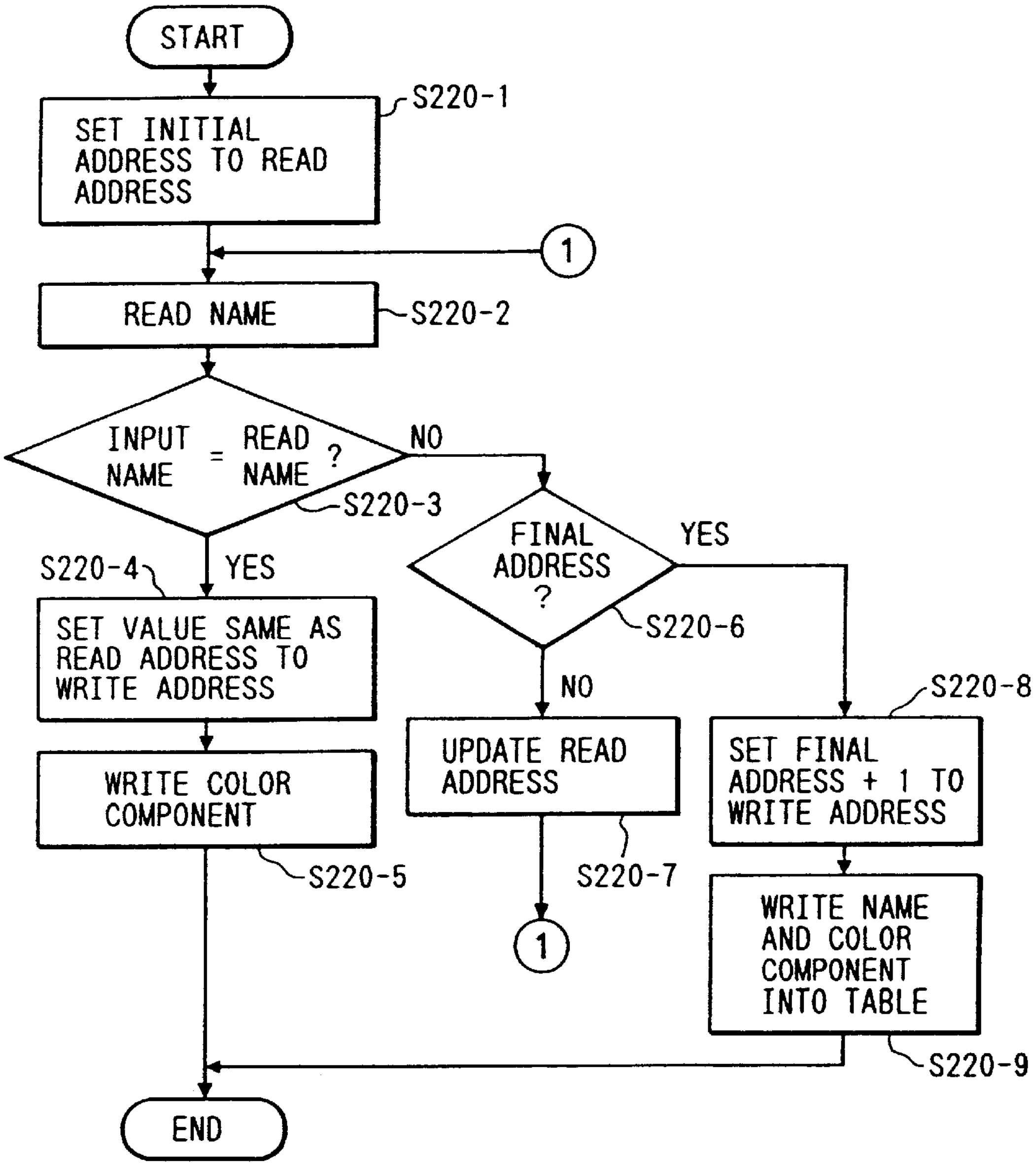

The ROM 213 stores control sequences to be executed by the CPU 212, including those of already known nature for the recording operation, and those of the present invention shown in FIGS. 8 and 9.

The RAM 214 is used for temporary storage of the information received from the host computer 201, image information to be recorded and interim results of operation of the CPU 212. The color table RAM 215 stores a color table, to be explained later, for converting the synthesized color into color components (record-related information) of basic colors. The CPU 212 extracts the color components of the synthesized color by keyword search of said color table. Thus the color table RAM 215 functions as memory means.

The interface 216 is connected to printing mechanism 217, to which recording command of the CPU 212 is transmitted through said interface 216.

FIG. 7 shows the structure of the color table embodying the present invention, wherein provided are columns for storing the color component values of basic R, G, B colors, a column for name, a pointer area and a column for secondary and subsequent names, respectively corresponding to table numbers.

Common color names, such as "RED" for red color and "GREEN" for green color, are stored initially, in the form of character trains, together with the color components. In the present embodiment, plural names can be registered for the same color components, and a column is provided for such names. For example, plural names such as "RED", (Chinese Kangi characters "aka-iro" for "RED COLOR"), etc. can be considered for a same red color. In such case a same color can be designated by plural different names. The column for the names includes a pointer area, containing a pointer indicating whether the next column contains any names. For example, "0" in the pointer area indicates that the next column does not contain any name.

Names can be registered for the already existing color components and new color components into such color table, through the host computer 201.

In the following there will be explained the function of the above-explained circuit, with reference to a flow chart shown in FIG. 8.

A) Registration of Name

When the image information to be recorded and the character codes "BLUE" indicating the name of color of the recording are sent, together with a recording command, from the host computer 201, these information are temporarily stored in the input buffer 211 (step S205 in FIG. 8). The CPU 212 identifies the codes of the information stored in the input buffer, and detects the recording command (steps S205, S210 and S230).

Based on said detection, the CPU 212 effects keyword search on the color table of the color table RAM 215 (cf. FIG. 15), for the received name "BLUE". If the pointer area has a value "1", the CPU also reads the secondary names of the color table and effects the keyword search based on the received name (step S231 in FIG. 8).

More specifically, the CPU compares the received name with each of the names of the color table, and reads the color components associated with the coinciding name.

The received image information is recorded with said color components (step S232 in FIG. 8).

B) Initial or Additional Registration by Name

When a name and color components to be registered are sent, together with a registration command, from the host computer 201, the CPU 212 discriminates the kind of the received registration command, and, if it is an initial registration command, the CPU detects the first table portion in the empty area of the color table, and writes the received name and color components in said color table (steps S210, S215 and S220 in FIG. 8).

FIG. 9 shows the sequence of registration corresponding to the actual program. In said sequence, if a name same as the received one is already recorded in the color table, the color components of such name in the color table are changed to those received.

Also when an additional registration command is received, a name portion of the basic color in the received name is extracted. Then the name area of the basic colors of the color table is searched, and the received name and color components are recorded in the top empty part of said area (steps S210, S215 and S225).

C) Output of Content of Color Table

When an output command for the content of the color table is received from the host computer 201, the CPU 212 reads the names and corresponding color components in succession from the top address of the color table, and sends these data to the host computer 201, which shows the received information on a display (steps S210, S230, S240 and S241 in FIG. 4).

As explained in the foregoing, the present embodiment extracts the color components recorded in the color table, by keyword search based on the name of the color. It is therefore easily possible to understand the color represented by the color components stored in the color table.

Also following variations can be applied to the present embodiments:

1) It is also possible to generate screened patterns or overlay forms in the host computer or in the word processing apparatus, then attach names to such character or graphic patterns, and form a code-pattern conversion table in the memory of the recording apparatus. In such case of keyword search function of the CPU 212 is utilized to convert the received code into the image pattern for recording.
2) In addition to the process explained in the present embodiment, there may naturally be added other processes such as the change of names recorded in the color table or the erasure of the registered data.
3) In the present embodiment, the input and display of the name and color components are conducted in the host computer 201, but these operations may be made in the recording apparatus. In such case an input keyboard and a display unit are provided in the recording apparatus.

As explained in the foregoing, the present embodiment allows to read the record-related information, to be used in the recording, from the memory means by keyword search instead of search by address. Consequently the user can easily understand the content of the memory means, and the manufacture of the apparatus is also facilitated since the storage addresses of the record-related information need not be fixed in advance.

Embodiment 3

Following embodiment is to control the output of a list (samples) of registered color information, by providing input means for entering color information to be registered from a host apparatus; conversion means for converting said color registration information to the density information of coloring materials of the recording apparatus; setting means for setting a predetermined code (index number) for said color registration information; memory means for storing said color registration information according to said index numbers; and output means for releasing the color registration information, stored by said memory means, according to said index numbers.

Figure 10:
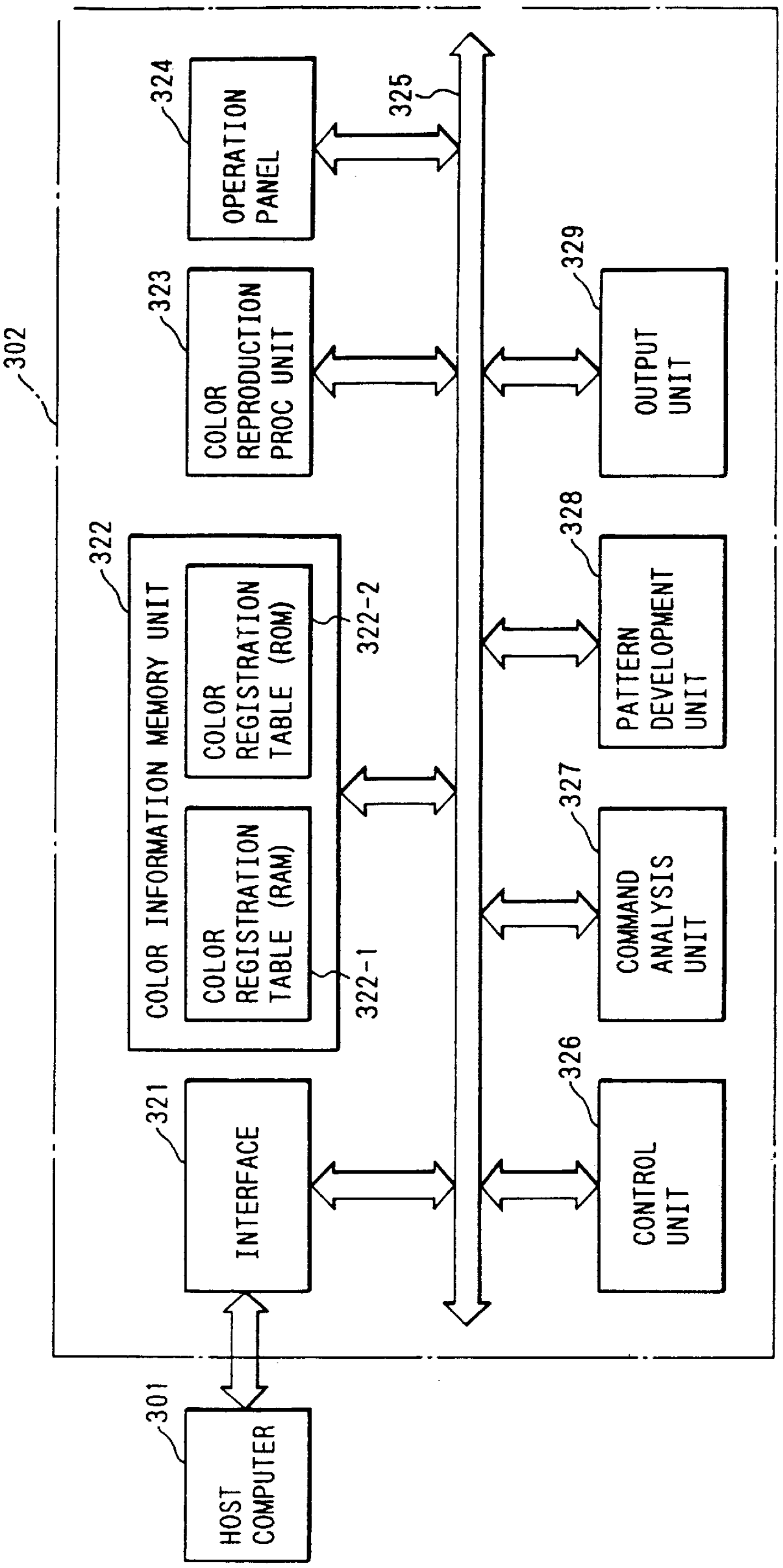
FIG. 10 is a block diagram of an apparatus embodying the present invention.

FIG. 10 is a block diagram of a recording apparatus of the present embodiment.

In FIG. 10 there are shown a host computer 301 for sending print data and print command, and a main body 302 of the recording apparatus of the present embodiment.

The main body 302 is composed of a microprocessor including a RAM and a ROM, further equipped with an interface 321 for data exchange with the host computer 301; a color information memory unit 322 including color registration tables 322-1 (RAM), 322-2 (ROM) for storing color designating information and further containing information for color reproduction process; a color reproduction process unit 323 for effecting the color reproduction process; an operation panel 324 for setting various parameters controlling the printing operation; a data bus 325; a control unit 326 for controlling the entire apparatus; a command analysis unit 327 for analyzing the print data and print command; a pattern development unit 328 for developing character or graphic color data into a bit map memory of a frame of each of Y, M, C and K colors; and an output unit 329 for forming a permanent visible image on a recording sheet for example by a color laser beam printer, based on thus developed color data.

Figure 11A:
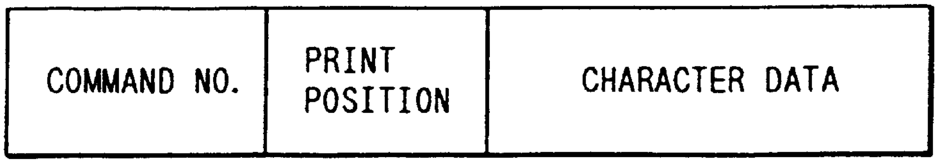
FIGS. 11A and 11B are views showing examples of character print command and character color designation command.
Figure 11B:
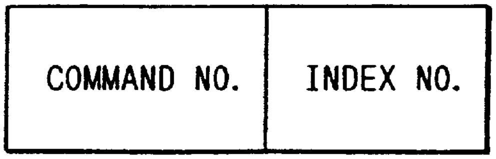

FIGS. 11A and 11B respectively show examples of a character print command and a character color designating command, in case of printing characters with a color.

As shown in FIG. 11A, the character print command is composed of a command number, a print position, and character data to be printed. Also as shown in FIG. 11B, the character color designating command is composed of a command number, and an index number indicating the color registration data in the color registration tables of the color information memory unit 322.

Figure 12:
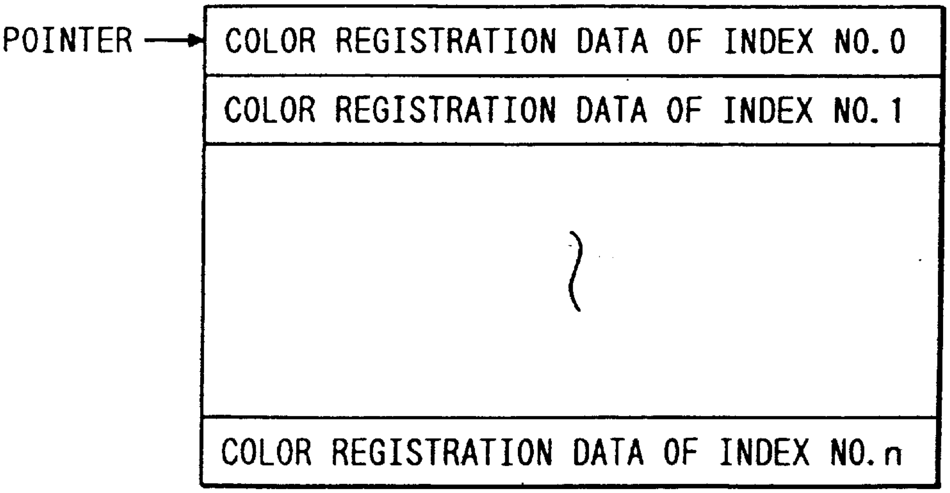
FIG. 12 is a view of a color registration table.

FIG. 12 illustrates said color registration tables 322-1, 322-2, in which the color registration data are stored according to index numbers 0–n (predetermined number). The table 322-1 is composed of a RAM and is rewritable by the data from the host computer 301, as will be explained later. On the other hand, the table 322-2 is composed of a ROM in which predetermined colors are registered in advance, as default.

The color registration data are luminance data of R, G and B or density data of C, M, Y and K used for designating colors in forming characters or graphic patterns.

Figure 13:
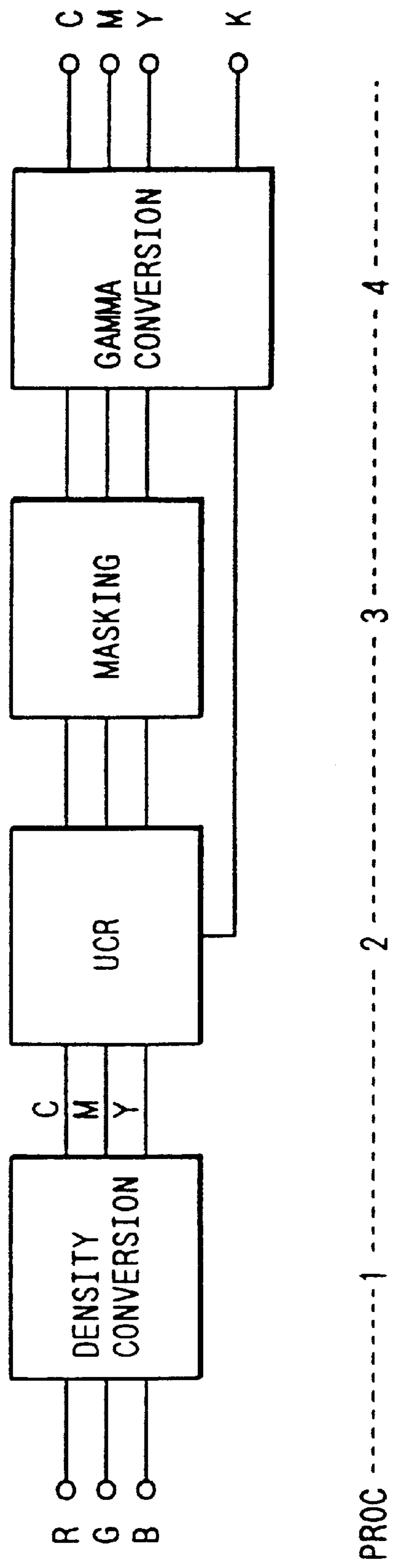
FIG. 13 is a view showing an example of color reproduction (color data conversion) process.

FIG. 13 shows an example of color reproduction process for converting the luminance R, G, B data into density C, M, Y, K data.

A process 1 effects density conversion, by applying logarithmic conversion to the R, G and B luminance data to obtain C, M and Y density data.

A process 2 effects undercolor removal for extracting the black data K from the data C, M and Y.

A process 3 effects masking for applying correction to the unnecessary absorption characteristics of the toner or ink of C, M and Y colors, thereby achieving appropriate color reproduction.

A process 4 effects gamma conversion for adjusting the contrast and brightness of the image.

The above-mentioned processes are conducted in the color reproduction process unit 323.

Figure 14:
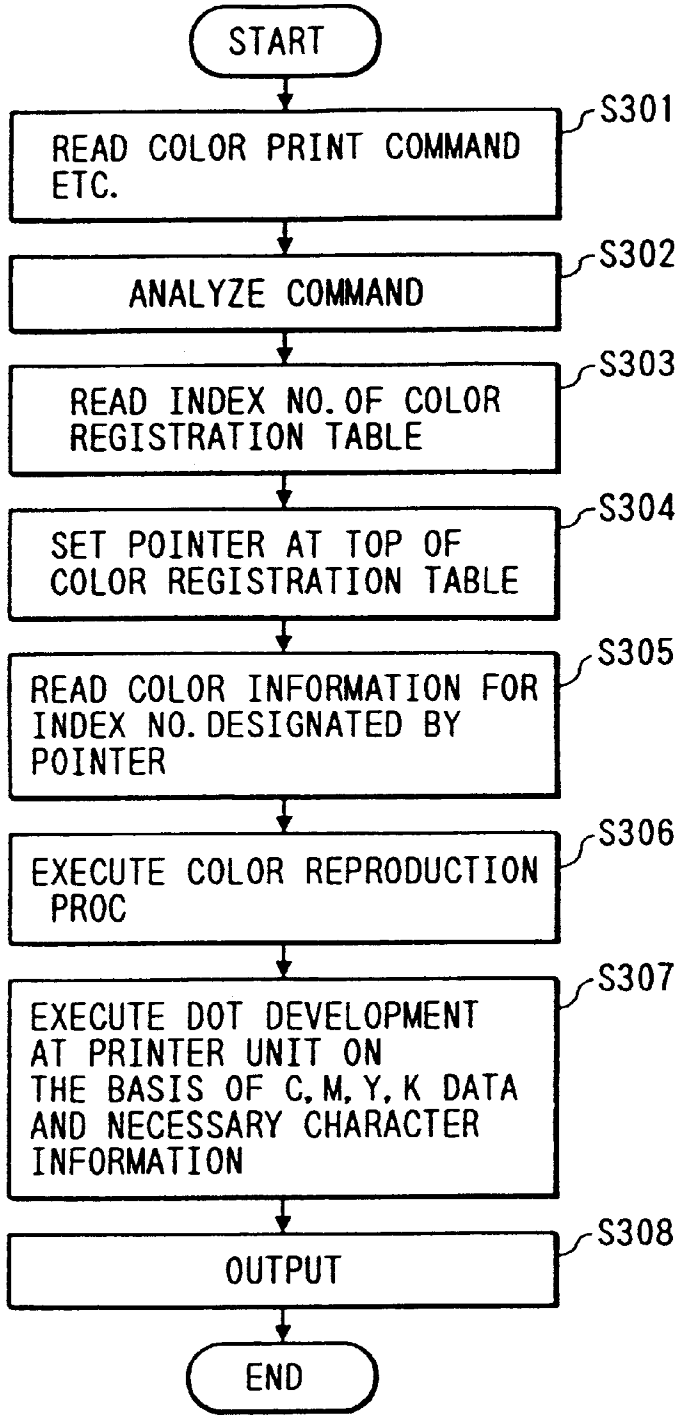
FIG. 14 is a flow chart of a sequence from reading of a character color designation command to output of color printed character.

FIG. 14 is a flow chart for processing the color print command etc. (FIG. 11) transmitted from the host computer 301 and printing characters in color.

A step S301 fetches pattern information including the color print commands (FIG. 11) and character information (character size etc.) transmitted from the host computer 301, and a step S302 executes the analysis of said command.

A step S303 extracts, from the character color designating command (FIG. 11B), the index number of the color registration table (FIG. 12).

Then a step S304 sets a pointer at the top of the color registration table, and a step S305 advances the pointer to an area storing the color information corresponding to the fetched index number and reads the color information (assumed to be luminance information of R, G and B colors) of said area.

A step S306 then converts, in the color reproduction process unit 323, the luminance data of R, G, B colors into density data of C, M, Y and K colors.

A step S307 executes dot development in the pattern development unit, based on the above-mentioned density data of C, M, Y and K colors and necessary character information.

Then a step S308 records characters as a permanent visible image on a recording sheet, based on the data developed in the step S307.

As explained in the foregoing, it is rendered possible to obtain the information of the color registration tables according to the index number (command parameter) and to print characters based on said information.

Figure 15:
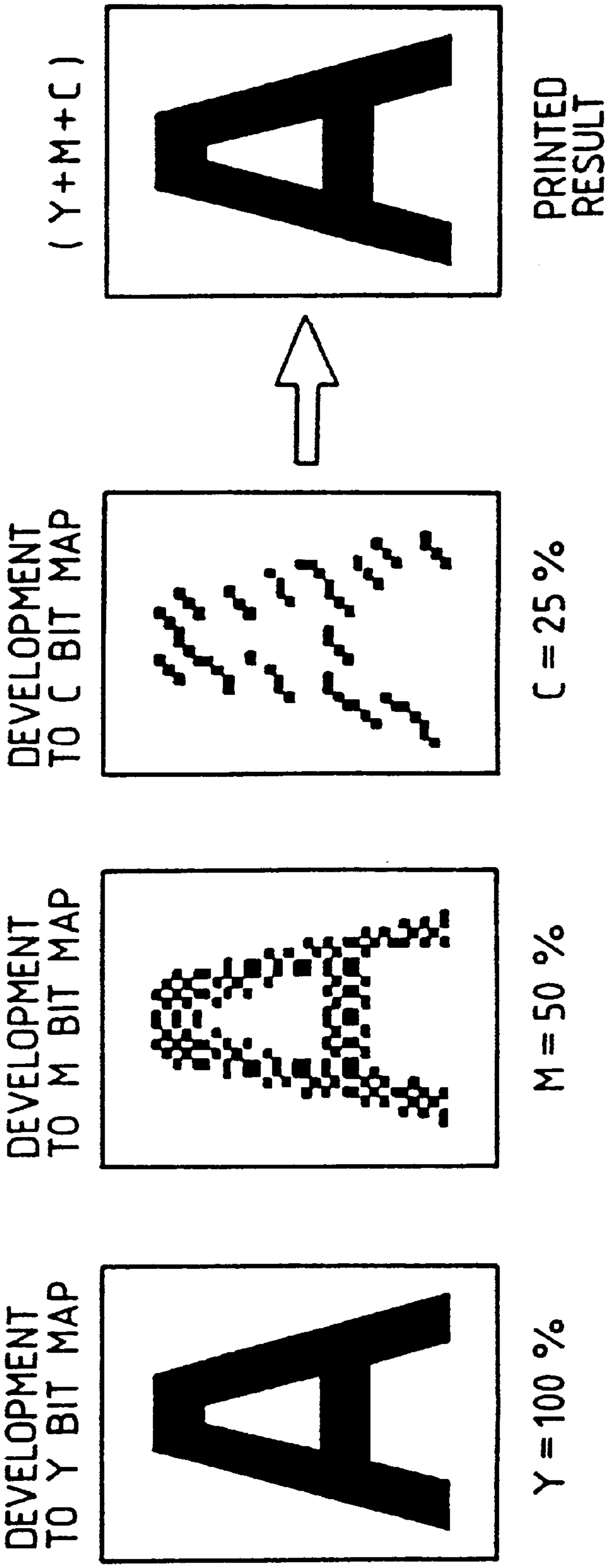
FIG. 15 is a view showing an example of character color output to a binary printer.

FIG. 15 shows the result of printing of a character "A" with color information Y=100%, M=50%, C=25% and K=0% immediately after the step S306. Since the printer of the output unit 329 in the present embodiment is composed of a binary printer, the desired density is represented by the dot density.

FIG. 16 shows examples of the color registration command.

Said command is composed, corresponding to four data of color information, of an index number used as reference for storage in the color registration table, a classification flag for identifying the data format, and color value data of respective data format.

In FIG. 16, H, S and L respectively indicate hue, chroma and brightness.

FIGS. 17A and 17B show the structures of the color registration table.

FIG. 17A shows a structure capable of storing different data formats explained above. The area of storage is determined according to the index number, and the classification flag, for identifying the data format, is stored at the same time. A number n is determined in advance.

FIG. 17B shows a structure for storing commands of a format with Y, M, C and K colors. All the commands are stored according to the index numbers, after the color data are converted into C, M, Y, K values.

$C_0$, $M_0$, $Y_0$ and $K_0$ are C, M, Y, K values corresponding to an index number 0, and $C_n$, $M_n$, $Y_n$ and $K_n$ are those values corresponding to an index number n.

Figure 18:
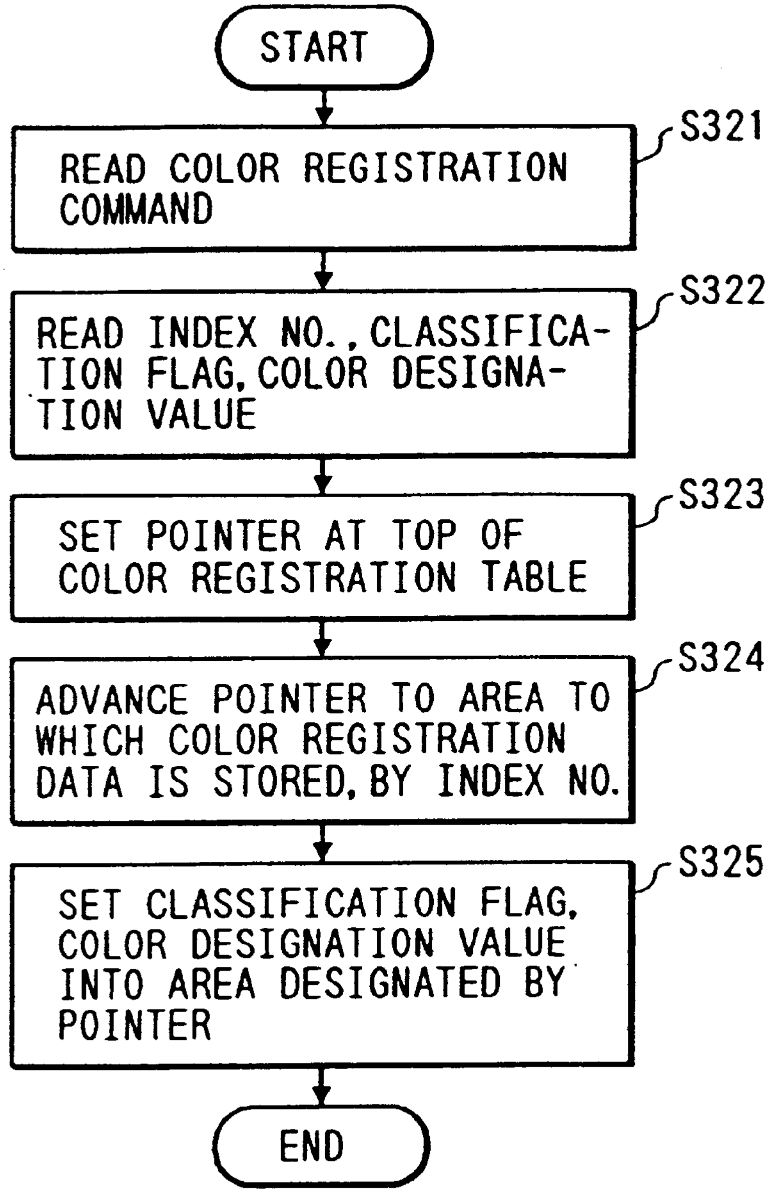
FIGS. 18 and 19 are flow charts of a sequence from reading of a color registration command to setting of color registration information in the color registration table.

FIG. 18 shows an algorithm for receiving a color registration command (FIG. 16) from the host computer and storing the color registration information in the color registration table shown in FIG. 17A. At first a step S321 fetches the color registration command, and a step S322 extracts, in the index analysis unit 327, the index number, classification flag and color designating values.

Then a step S323 sets a pointer at the top of the color registration table (FIG. 17A).

A step S324 advances the pointer to an area for storing the color registration data corresponding to the index number read in the step S322.

Then a step S325 stores the classification flag and color designating values in said area, and the sequence is terminated.

As explained in the foregoing, color registration information of different data formats can be stored in the color registration table, utilizing the classification flag.

Figure 19:
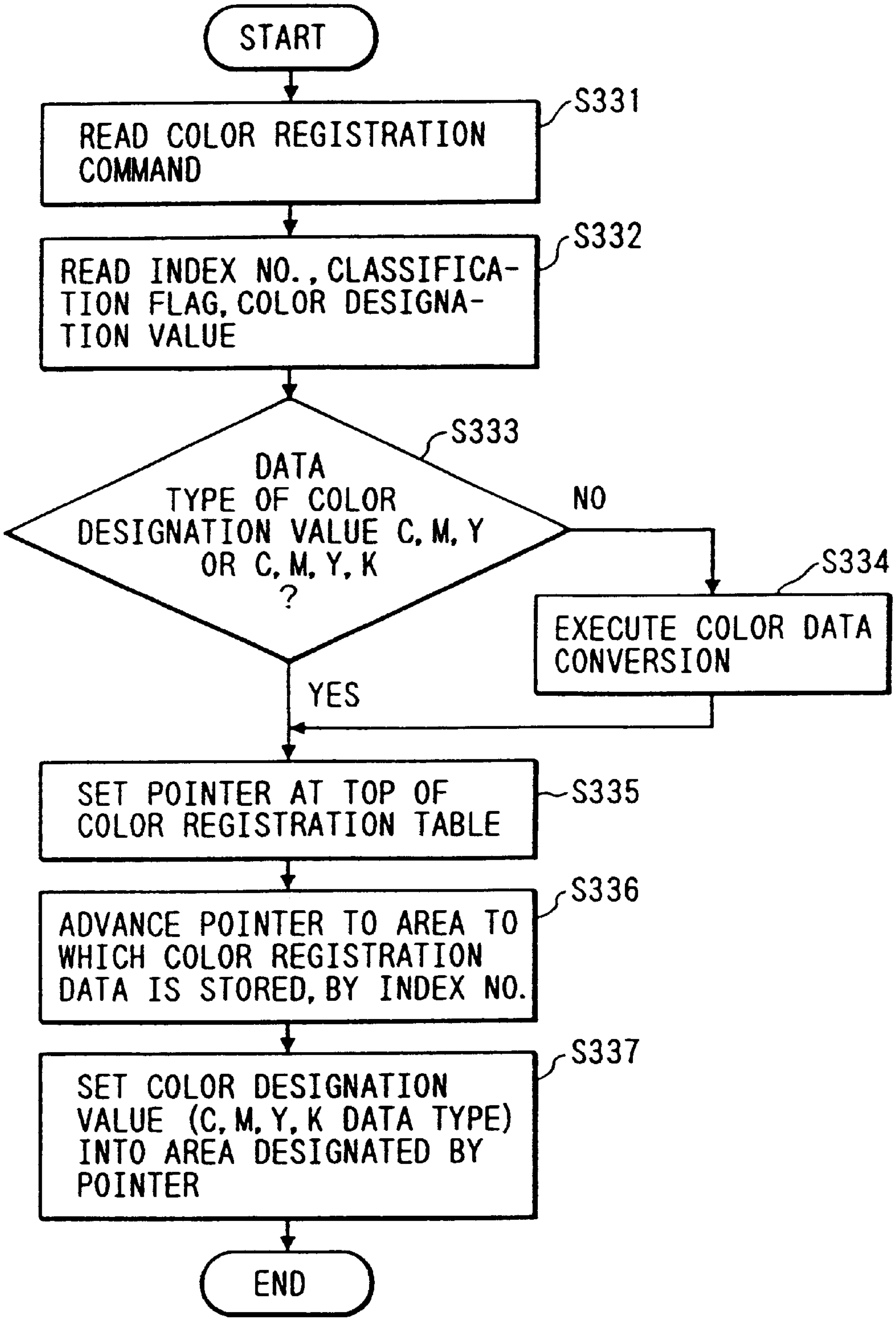

FIG. 19 shows an algorithm for receiving a color registration command (FIG. 16) from the host computer and storing the color registration information in the color registration table shown in FIG. 17B.

At first a step S331 reads the color registration command.

Then a step S332 extracts, in the command analysis unit 327, the index number, classification flag and color designating value.

A step S333 discriminates, based on the classification flag, whether the data of the color designating value are C, M and Y or C, M, Y and K.

If the data are given in the C, M, Y format or C, M, Y, K format, the sequence proceeds to a step S335. If not, the sequence proceeds to a step S334 for converting the color designating value into the data of C, M, Y, K format, and the sequence then proceeds to the step S335.

Said conversion in the step S334 is achieved, in case of the luminance data of R, G, B format, by the color reproduction process in the density data of C, M, Y, K format shown in FIG. 13.

On the other hand, the luminance data of H, S, L format are once converted into the luminance data of R, G, B format and then converted into the density data C, M, Y, K format.

The step S335 sets a pointer at the top of the color registration table shown in FIG. 17B.

Then a step S336 advances the pointer to an area for storing the color registration data, according to the index number read in the step S332.

Then a step S337 sets the color designating values in the C, M, Y, K format in said area for storage, and the sequence is terminated.

As explained in the foregoing, the color registration information of different formats can be stored in the color registration table after conversion into the C, M, Y, K format.

Figure 20:
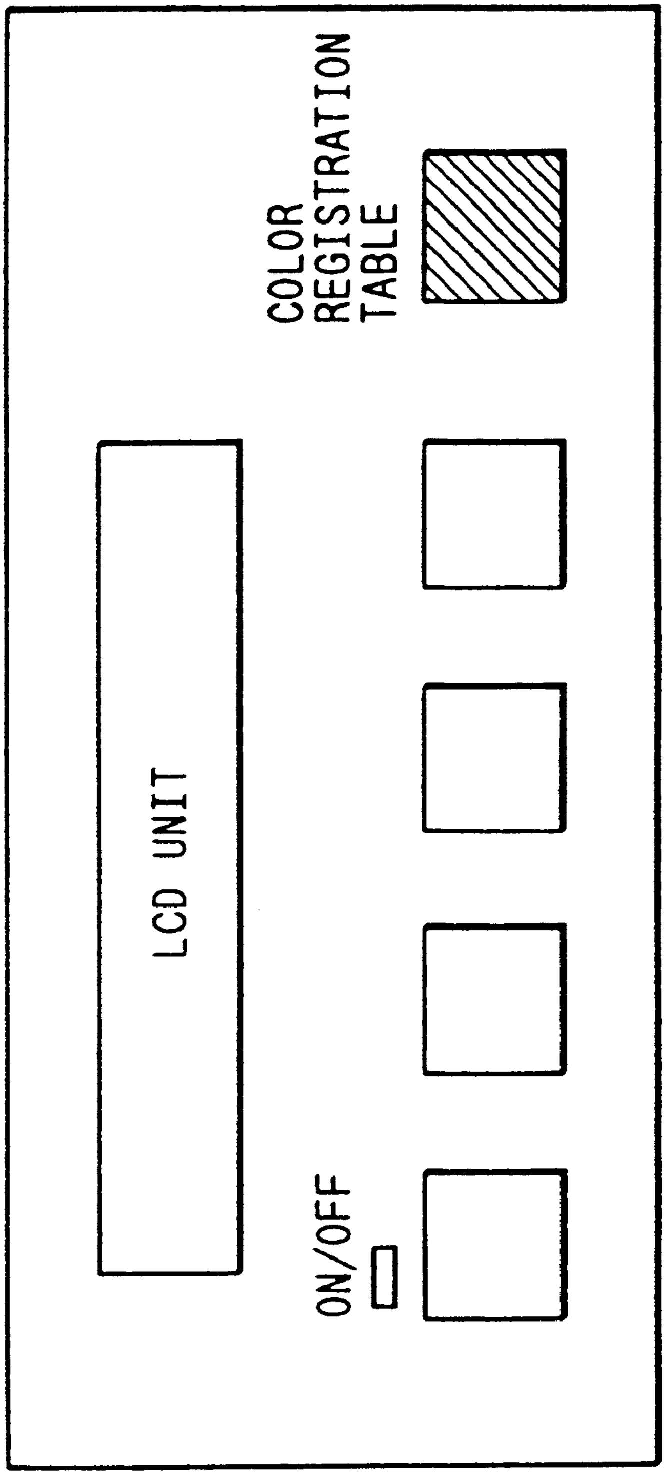
FIG. 20 is a view of an operation panel.

FIG. 20 shows the operation panel 324 shown in FIG. 10. Said panel is composed of a liquid crystal display (LCD) unit and switches, in which the one at the light-hand end is used for generating a list of content (registered colors, index numbers, registered data) of the color registration table.

Figure 21:
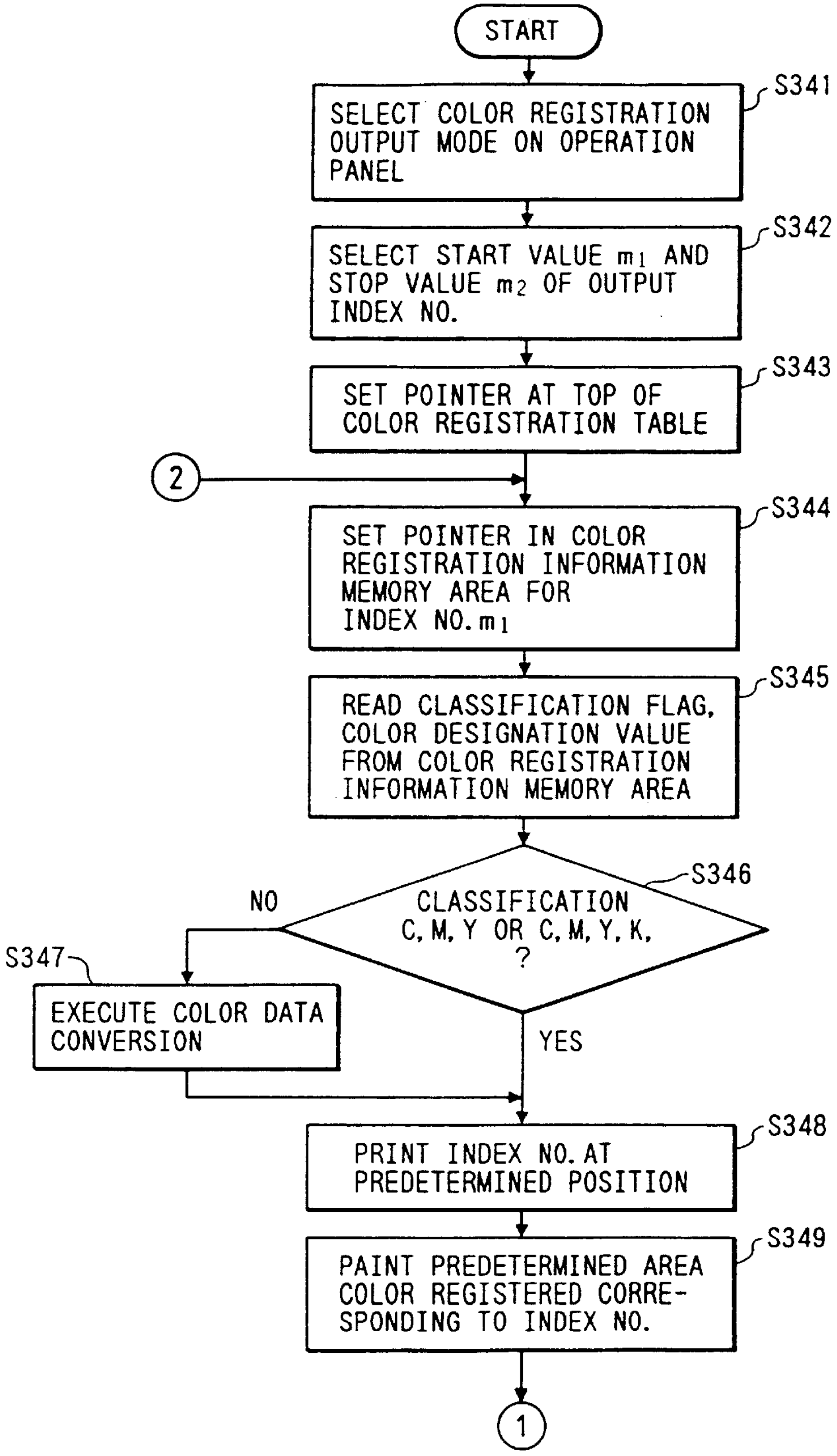
FIGS. 21 and 22 are flow charts of a sequence for output of a list by designating the content of the color registration table by index numbers entered from the operation panel.
Figure 22:
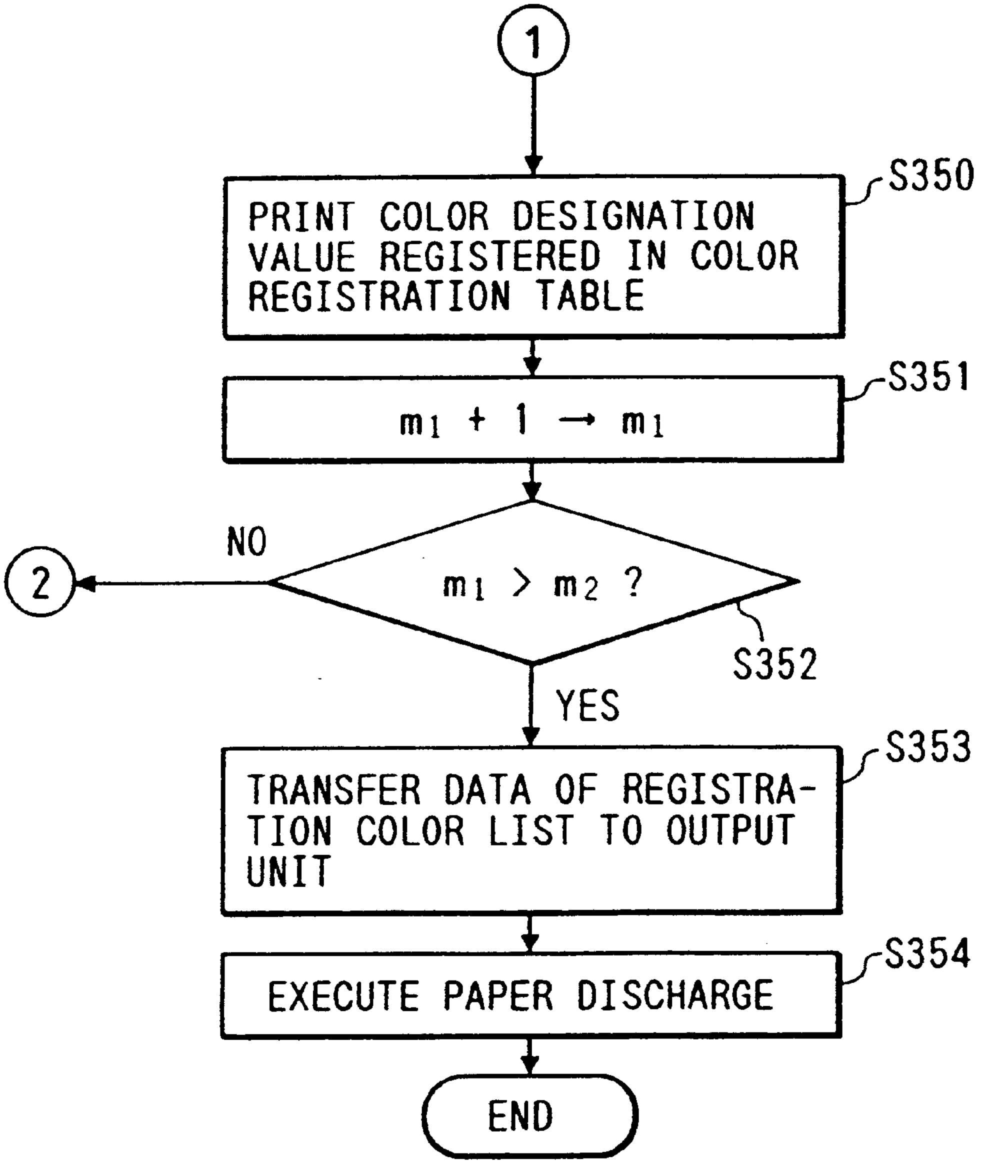

FIGS. 21 and 22 illustrate algorithm from designation of an index number through the operation panel 324 shown in FIG. 10 to the release of the list of content of the color registration table (FIG. 17A).

A step S341 selects a color registration output mode by the color registration switch shown in FIG. 20.

In a step S342, the index numbers of the color registration data to be released in said list are selected by the operation panel.

More specifically, a start value $m_1$ and an end value $m_2$ of the index numbers are selected, whereby the color registration data corresponding to the index numbers from $m_1$ to $m_2$ can be released as a list.

Then a step S343 sets a pointer at the top of the color registration table (FIG. 17A).

A step S344 sets the pointer at the storage area for the color registration information corresponding to the index number $m_1$.

Then a step S345 reads the classification flag and color designating values from said storage area.

A step S346 discriminates, by the classification flag, whether the data are in the C, M, Y format or in the C, M, Y, K format, and, if the data are in either format, the sequence proceeds to a step S348. If not, the sequence proceeds to a step S347 to convert the color designation values to the data of C, M, Y, K format, and then to the step S348.

The conversion in said step S347 is achieved, in case of the luminance data of R, G, B format, by the color reproduction process to the C, M, Y, K format shown in FIG. 13.

Data of H, S, L format are once converted into the luminance data of R, G, B format and then converted to the data of C, M, Y, K format according to the above-mentioned method.

Then a step S348 prints the value of $m_1$ in a predetermined position as an index number.

A step S349 causes the pattern development unit 328 shown in FIG. 10 to develop color data in a predetermined area, based on the color designation values corresponding to said index number $m_1$. Thus the pattern development unit 328 executes dot development of the index number, registration number and density values of color components. The structure of the apparatus can be simplified by using the pattern development unit for the normal process mode in the development unit for the normal process mode in the development of color information of the samples of registered colors.

Then a step S350 prints the color designation values used in the step S349, in a predetermined position, according to the classification flag.

Then a step S351 increases the value of $m_1$ by one.

A step S352 compares $m_1$ with $m_2$, and, if $m_2 \leqq m_2$, the sequence returns to the step S344 to repeat the above-explained sequence. If not, the sequence proceeds to a step 353 to transfer the developed color data of the list to the output unit 329 shown in FIG. 10. Then a step S354 discharges the recording sheet and the sequence is terminated.

Also a sequence of receiving a color registration command (FIG. 16) from the host computer and releasing a list of content of the color registration table shown in FIG. 17B can be realized in the above-explained algorithm, by reading the color designation values only in the step S345 and skipping the steps S356 and S357.

As explained in the foregoing it is rendered possible to obtain a list of content of the color registration table, by designating index numbers from the operation panel.

FIGS. 23 and 24 illustrate examples of the list obtained above-explained algorithm.

FIG. 23 shows the result of output of the content of the color registration table shown in FIG. 17A, with $m_1$=1 and $m_2$=255. Also FIG. 24 shows the result of output of the content of the color registration table shown in FIG. 17B, with $m_1$=10 and $m_2$=20. The registered color data may be represented in levels, or in percentages.

Figure 25:
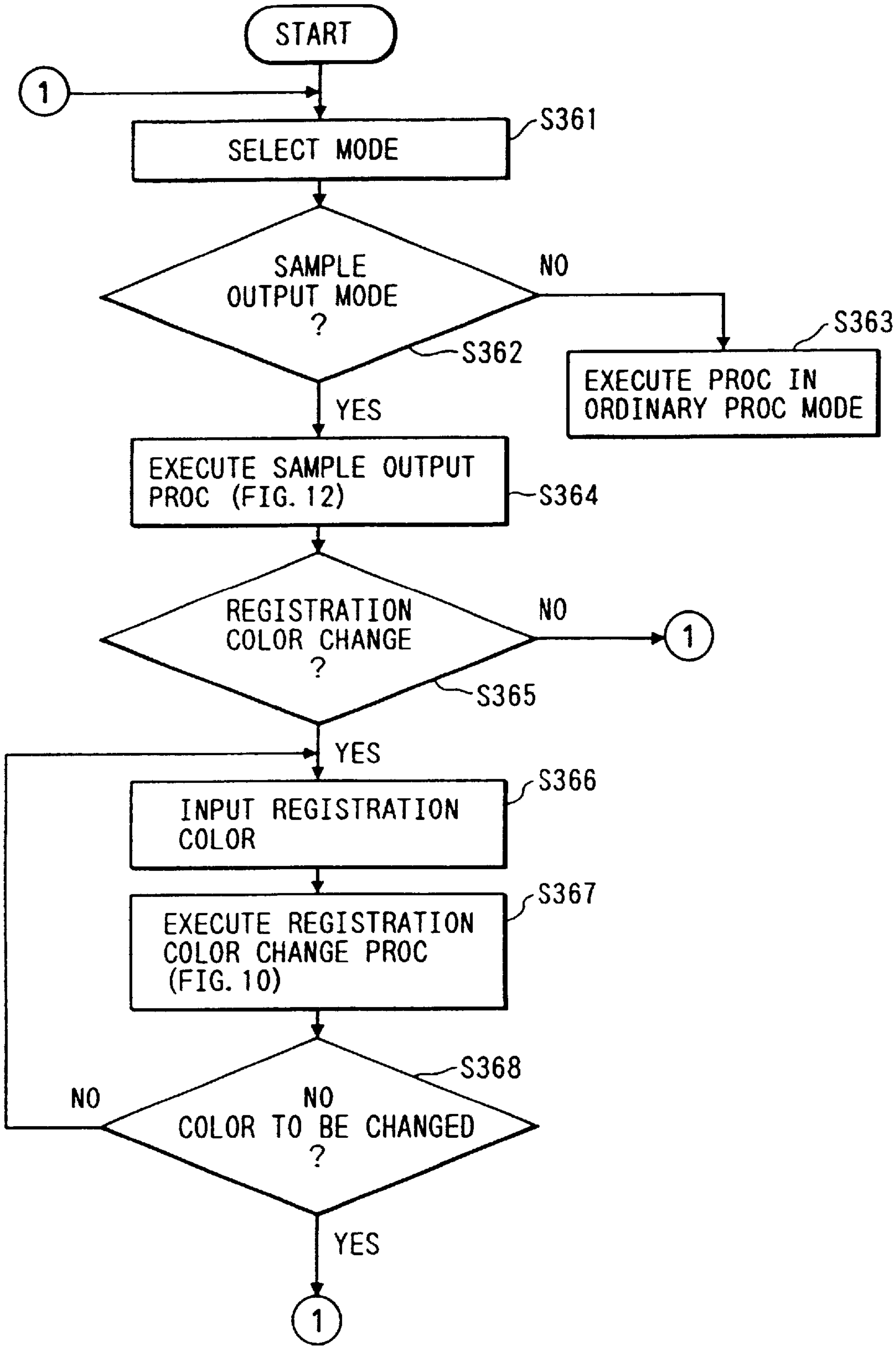
FIG. 25 is a flow chart showing the entire sequence of an embodiment of the present invention.

FIG. 25 is a flow chart, showing the entire control sequence of the present embodiment, including the operations by the operator.

At first a step S361 selects the operation mode, and, if a step S362 identifies that the mode is not the sample output mode, the sequence proceeds to the ordinary process mode in a step S363. On the other hand, if the sample output mode is identified, a step S364 executes a sample output process explained in the flow chart of FIG. 21. The mode selection is conducted by an unrepresented operation panel of the host computer 301, or by the operation panel 324 of the recording apparatus 302.

As shown in FIG. 23, the output sample contains the index number, registered color printed in a predetermined area, and color component data of the registered color. Consequently the operator can judge, from said sample, whether the desired color is obtained, and, if not, can alter the registered color. Particularly in the present embodiment, the operator can easily manipulate the host computer in the alteration of the registered color, since the sample includes the index number and the color component data.

In case of altering the registered color (step S365), the index number of said registered color and the corresponding color component data are entered from the unrepresented operation panel of the host computer 301 (step S366), and the registered color is altered according to the flow chart shown in FIG. 19 and in response to said data input (step S367). If other colors are to be altered also, the steps S366 and S367 are repeated (step S368).

As explained in the foregoing, the present embodiment allows to easily obtain a desired registered color.

Variation of Third Embodiment

In the foregoing embodiment, there have been explained RGB format, CMYK format, CMY format and HSL format only, but it is applicable also to other data formats such as L*a*b* format, L*u*v* format, YIQ format etc.

Also in the foregoing embodiment, the conversion to the CMYK format has been explained on the RGB format and HSL format only, but the conversion is also possible for other data formats.

Also in the foregoing embodiment, the CMY format is not subjected to data conversion process, but it is naturally possible to convert the CMY format into the CMYK format for example by the undercolor removal prior to registration.

Also in the foregoing embodiment, in case of list output of the color registration table shown in FIG. 17B, the color designation values are given only in the C, M, Y and K values corresponding to the index number, as shown in FIG. 24, but it is also possible to indicate the color designation value in the data format transmitted from the host computer (as shown in FIG. 23), by providing memory means for storing said color designation values.

Furthermore the output printer is not limited to the color laser beam printer but can also be a color dot printer, a color ink jet printer or a color thermal transfer printer.

Also said printer is not limited to a binary printer but can be a multi-level printer. In such case the pattern development unit will be equipped with a multi-level bit map memory.

As explained above, the foregoing embodiment of the present invention allows to easily confirm the matching of the color on display and the output color obtained in the recording apparatus, since a list of color registration information transmitted from the host apparatus to the recording apparatus can be obtained by an instruction through the operation panel.

Also since the actual color output data need not be printed, it is rendered possible to reduce the consumption of toners or inks, and to reduce the waiting time required for the output of color samples.

Furthermore the results on the obtained list may be utilized for fine adjustment of the colors.

Furthermore, the color information corresponding 1:1 to the color information code is not limited to the RGB format, but can also be, for example, YMC format, YMCK format, HSL format, L*a*b* format, YIQ format or Yu*v* format.

The color information need not necessarily be printed only, but can also be displayed at the same time. In such case the color information is advantageously given in the RGB combination.

Furthermore, a recording apparatus obtained by the combination of the first to third embodiments is also conceivable.

Figure 26:
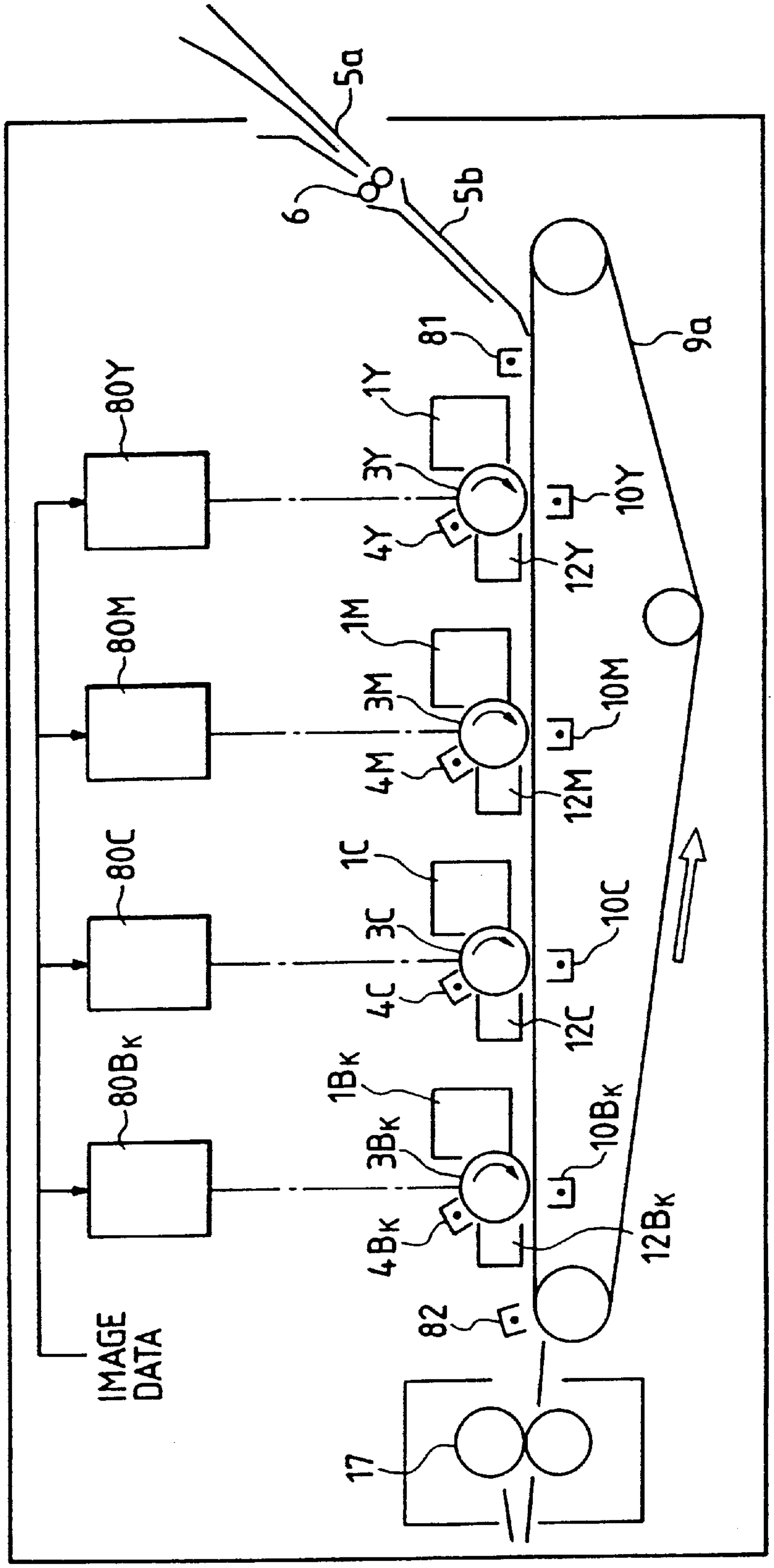
FIG. 26 is a view showing the structure of the color laser beam printer to which the present invention is applied.

FIG. 26 shows the structure of the color printer unit 324 (FIG. 1), printing mechanism 217 (FIG. 6) or output unit 329 (FIG. 10).

The color laser beam printer shown in FIG. 26 is provided with photosensitive members 3Y (yellow), 3M (magenta), 3C (cyan) and 3BK (black) exclusive for respective colors, and said photosensitive members are respectively associated with laser beam scanners 80Y, 80M, 80C, 80BK; developing units 1Y, 1M, 1C, 1BK; transfer chargers 10Y, 10M, 10C, 10BK; and cleaners 12Y, 12M, 12C, 12BK. The transfer sheet is guided through sheet guides 5*a*, feed rollers 6 and sheet guides 5*b*, then subjected to corona discharge by an attraction charger and securely attracted by a conveyor belt 9*a*. Subsequently it receives the transfers of images formed on said photosensitive members by the transfer chargers 10Y, 10M, 10C, 10BK, then separated from the conveyor belt 9*a* by a charge eliminator 82, and subjected to image fixation by a fixing unit 17 to provide a full-color image.

However the printer may be of a type having a photosensitive member commonly for different colors, utilizing so-called rotary developing unit, instead of the above-explained type utilizing photosensitive members for respective colors.

There may also be used a printer of other types, such as an ink jet printer.

In particular there may be employed a so-called bubble jet printer based on liquid droplet discharge utilizing membrane boiling induced by thermal energy, as disclosed in U.S. Pat. Nos. 4,723,129 and 4,740,786.

The present invention is not limited to the foregoing embodiments but is subject to various modifications and applications within the scope and spirit of the appended claims.

What is claimed is:

1. A method for supplying color image data to a printing apparatus which prints a color image on a medium based on a command from an external apparatus, comprising the steps of:

receiving the command from the external apparatus;

analyzing the command and generating plural color component data;

registering color information which represents a relationship between a color information code and plural color component data values in a color registration memory; and supplying plural color component data such that the content of the color registration memory is printed on the medium in the form of a registration color list, wherein, in said supplying step, the color image represented by the plural color component data, the color information code and the plural color component data values are printed together on the medium.

2. A method according to claim 1, wherein a character command and a color command are received from the external apparatus in said receiving step.

3. A method according to claim 1, wherein density conversion is performed in said analyzing step.

4. A method according to claim 1, further comprising the step of designating a part of the color information to be printed on the medium.

5. A method according to claim 1, further comprising the step of changing the color information registered in the color registration memory after printing an image of the registration color list.

6. A method according to claim 1, wherein the registration color list includes an index number and a registration color.

7. A method according to claim 6, wherein said registration color list further includes plural color component values corresponding to the registration color.

8. A method according to claim 1, wherein the printing apparatus is a color laser printer.

9. A method according to claim 1, wherein the printing apparatus is an ink jet printer.

10. An apparatus for supplying color image data to a printing apparatus which prints a color image on a medium based on a command from an external apparatus, comprising:

receiving means for receiving the command from the external apparatus;

analyzing means for analyzing the command and generating plural color component data;

registering means for storing color information which represents a relationship between a color information code and plural color component data values; and supplying means for supplying plural color component data such that the content of said registering means can be printed on the medium in the form of a registration color list, wherein the content of said registering means printed on the medium includes the color image represented by the plural color component data, the color information code and the plural color component data values.

11. An apparatus according to claim 10, wherein said receiving means is adapted to receive the color information code, and wherein the registering means includes memory means for storing color information corresponding to the color information code, said apparatus further including second input means, different from said first input means, for entering color information different from that stored in said memory means.

12. An apparatus according to claim 10, wherein said first input means is also adapted to enter character code or image data from a host computer.

13. An apparatus according to claim 12, further comprising a memory for developing the character code.

14. An apparatus according to claim 12, wherein said second input means is a connector connectable to an external memory device and is adapted to enter the color information stored in said external memory device.

15. An apparatus according to claim 14, wherein said external memory device is a memory card.

16. An apparatus according to claim 11, further comprising discriminating means for discriminating whether the color information stored in said memory means and the color information entered by said second input means are the same.

17. An apparatus according to claim 16, wherein, if said discriminating means identifies that the color information stored in said memory means and the color information entered by said second input means are not the same, image formation is conducted utilizing both the color information stored in said memory means and the color information entered by said second input means.

* * * * *

UNITED STATES PATENT AND TRADEMARK OFFICE

CERTIFICATE OF CORRECTION

PATENT NO. : 6,731,791 B2 
DATED : May 4, 2004
INVENTOR(S) : Shunya Mitsuhashi et al.

It is certified that error appears in the above-identified patent and that said Letters Patent is hereby corrected as shown below:

Column 2,
Line 60, “name” should read -- name of --.

Column 7,
Line 67, “these information are” should read -- this information is --.

Column 8,
Line 49, “Also” should read -- Also, the --.

Column 12,
Line 58, “$m_2 \leqq m2$,” should read -- $m_1 \leqq m_2$. --.

Column 14,
Line 25, “Yu*v* should read -- Y*u*v* --.

Signed and Sealed this

Fourteenth Day of September, 2004

JON W. DUDAS
*Director of the United States Patent and Trademark Office*